US012521751B2

(12) United States Patent
Ohira et al.

(10) Patent No.: US 12,521,751 B2
(45) Date of Patent: Jan. 13, 2026

(54) FOIL TRANSFER DEVICE

(71) Applicant: Brother Kogyo Kabushiki Kaisha, Nagoya (JP)

(72) Inventors: Ayaka Ohira, Nagoya (JP); Tomoya Yamamoto, Kasugai (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 561 days.

(21) Appl. No.: 17/936,929

(22) Filed: Sep. 30, 2022

(65) Prior Publication Data

US 2023/0022321 A1 Jan. 26, 2023

Related U.S. Application Data

(63) Continuation of application No. PCT/JP2021/011562, filed on Mar. 22, 2021.

(30) Foreign Application Priority Data

Apr. 1, 2020 (JP) ................................ 2020-065613

(51) Int. Cl.
*B05C 1/08* (2006.01)
*B41F 16/00* (2006.01)

(52) U.S. Cl.
CPC ............ *B05C 1/0821* (2013.01); *B41F 16/00* (2013.01)

(58) Field of Classification Search
CPC ..................... B05C 1/0821; B41F 16/00-0073
See application file for complete search history.

(56) References Cited

U.S. PATENT DOCUMENTS 8,323,430 B2 12/2012 Uber et al.
8,810,619 B2 8/2014 Kaneoya et al.
9,340,057 B1 5/2016 Aihara
(Continued)

FOREIGN PATENT DOCUMENTS

CN 101044061 A 9/2007
CN 103228452 A 7/2013
(Continued)

OTHER PUBLICATIONS

Oct. 17, 2023—(JP) Notice of Reasons for Refusal—App 2020-065613.
(Continued)

*Primary Examiner* — Dah-Wei D. Yuan
*Assistant Examiner* — Stephen A Kitt
(74) *Attorney, Agent, or Firm* — Banner & Witcoff, Ltd.

(57) ABSTRACT

In a foil transfer device, a controller causes a sheet to be conveyed by conveyor rollers to reach a transfer position in which a foil film and the sheet are to be nipped between a heating roller and a pressure roller (of which one is called “first roller”, and the other is called “second roller”), while the first roller is positioned in a release position, separated from the second roller, and a state of transport of the foil film is kept in a restricted state by a film-transport regulator. The first roller is moved and positioned in a nipping position while the sheet is laid on the transfer position and before a foil transfer area of the sheet reaches the transfer position. The state of transport of the foil film is changed from the restricted state to a release state after the first roller gets positioned in the nipping position.

19 Claims, 19 Drawing Sheets

(56) References Cited

U.S. PATENT DOCUMENTS

| | | | | |
|---|---|---|---|---|
| 2008/0295710 | A1* | 12/2008 | Ohsawa | B41F 33/16 101/23 |
| 2009/0178581 | A1* | 7/2009 | Paita | B65H 18/103 101/27 |
| 2009/0229734 | A1 | 9/2009 | Uber et al. | |
| 2013/0250026 | A1 | 9/2013 | Kaneoya et al. | |
| 2013/0255514 | A1 | 10/2013 | Yoshii et al. | |
| 2016/0114608 | A1 | 4/2016 | Aihara | |
| 2019/0094767 | A1* | 3/2019 | Sakai | G03G 15/2042 |

FOREIGN PATENT DOCUMENTS

| | | | |
|---|---|---|---|
| CN | 103260898 | A | 8/2013 |
| CN | 110509662 | A | 11/2019 |
| JP | S62-080075 | A | 4/1987 |
| JP | H05-042690 | A | 2/1993 |
| JP | H07-290685 | A | 11/1995 |
| JP | 2001-030466 | A | 2/2001 |
| JP | 2010-078424 | A | 4/2010 |
| JP | 2013-158986 | A | 8/2013 |
| JP | 2016-078424 | A | 5/2016 |
| JP | 2018-051766 | A | 4/2018 |
| JP | 2019-059235 | A | 4/2019 |
| JP | 2019-172452 | A | 10/2019 |

OTHER PUBLICATIONS

Sep. 29, 2022—(WO) IPRP—App PCT/JP2021/011562.
Apr. 12, 2023—(CN) First Office Action—App 202180020153.0.
Jun. 8, 2021—International Search Report—Intl App PCT/JP2021/011562.

* cited by examiner

PRE-TRANSFER PROCESS IN ENTIRE AREA TRANSFER MODE & FORWARD AREA TRANSFER MODE

POST-TRANSFER PROCESS IN ENTIRE AREA TRANSFER MODE & REARWARD AREA TRANSFER MODE

POST-TRANSFER PROCESS IN FORWARD AREA TRANSFER MODE & ENTIRE AREA TRANSFER MODE

PRE-TRANSFER PROCESS IN REARWARD AREA TRANSFER MODE & ENTIRE AREA TRANSFER MODE

FOIL TRANSFER DEVICE

REFERENCE TO RELATED APPLICATIONS

This application is a continuation application of International Application No. PCT/JP2021/011562 filed on Mar. 22, 2021 which claims priority from Japanese Patent Application No. 2020-065613 filed on Apr. 1, 2020. The entire contents of these prior applications are incorporated herein by reference.

BACKGROUND ART

A foil transfer device including a supply reel, a take-up reel, a heating roller and a pressure roller is known in the art. A foil film wound on the supply reel is to be taken up on the take-up reel. A sheet is laid on the foil film and fed through between the heating roller and the pressure roller. The heating roller heats the foil film and the sheet being nipped between the heating roller and the pressure roller. As the heating roller and the pressure roller rotate, the foil film and the sheet nipped therebetween are forwarded by the heating roller and the pressure roller whereby foil can be transferred onto an image (e.g., toner image) on the sheet. This process will be hereinafter called "foil transfer".

DESCRIPTION

In the conventional foil transfer device, advance rotation of the heating roller and the pressure roller, for example as started after receipt of a foil transfer instruction before starting feed of a sheet, would disadvantageously forward the foil film uselessly.

It would be desirable to reduce waste of the foil film.

An improved foil transfer device for transferring foil onto a sheet laid on a foil film containing the foil is proposed herein.

In one aspect, the foil transfer device comprises a supply reel, a take-up reel, a heating roller, a pressure roller, conveyor rollers, a film-transport regulator, a nip/release actuator, and a controller. A foil film is wound on the supply film. The take-up reel takes up the foil film thereon. The heating roller is configured to heat the foil film and a sheet. The pressure roller is configured to rotate, with the foil film and the sheet being nipped between the heating roller and the pressure roller, to thereby cause the sheet to move forward together with the foil film drawn out from the supply reel. The conveyor rollers are configured to convey the sheet, to feed the sheet to a transfer position in which the foil film and the sheet are to be nipped between the heating roller and the pressure roller to transfer foil onto a foil transfer area defined on a surface of the sheet. The film-transport regulator is capable of changing a state of transport of the foil film drawn out by the heating roller and the pressure roller, between a restricted state in which restriction is placed on the transport of the foil film and a release state in which the restriction is removed. The nip/release actuator is configured to move a first roller that is one of the heating roller and the pressure roller, relative to a second roller that is another of the heating roller and the pressure roller, between a nipping position in which the first roller is pressed against the second roller, and a release position in which the first roller is separated from the second roller.

The controller is configured to exercise control over the conveyor rollers, the nip/release actuator, and the film-transport regulator in such a manner that: the sheet fed by the conveyor rollers reaches the transfer position while the first roller is positioned in the release position and the state of transport of the foil film is kept in the restricted state; the first roller is moved and positioned in the nipping position while the sheet is laid on the transfer position and before the foil transfer area of the sheet reaches the transfer position; and the state of transport of the foil film is changed from the restricted state to the release state after the first roller gets positioned in the nipping position.

With this configuration, the transport of the foil film starts while the sheet is laid on the transfer position (i.e., after the sheet enters the transfer position), and thus the foil film which would be wasted if the transport of the foil film starts before the sheet reaches the transfer position can be utilized, so that waste of the foil film can be reduced significantly.

The film-transport regulator may comprise a switching mechanism (e.g., a clutch or a motor) configured to selectively effect and stop operation of the pressure roller and the heating roller. Herein, the controller is configured to cause the switching mechanism to stop the operation of the pressure roller and the heating roller to thereby change the state of transport of the foil film to the restricted state, and cause the switching mechanism to effect the operation of the pressure roller and the heating roller to thereby change the state of transport of the foil film to the release state.

The controller may be configured to cause the conveyor rollers in contact with the sheet to stop while the sheet is laid on the transfer position and before the first roller reaches the nipping position. With this configuration, the conveyance of the sheet can be stopped before the first roller not in operation (i.e., not rotated) starts being pressed against the second roller. Accordingly, the sheet can be prevented from entering the transfer position that is a position in which the foil film and the sheet are to be nipped between the first roller and the second roller, before effecting the operation (rotation) of the first roller and the second roller (i.e., starting the transport of the foil film) by the switching mechanism as the film-transport regulator. Therefore, undesirable warpage or wrinkling which would occur in the sheet fed into the transfer position formed between the first and second rollers not in operation can be avoided.

The foil transfer device may further comprise a position sensor configured to detect a position of the first roller. Herein, the controller may be configured to make a determination, based on a signal from the position sensor, as to whether or not the first roller is positioned in the nipping position.

The controller may be configured such that: when a sheet of which the foil transfer area is located at a first distance or farther from a leading edge of the sheet is fed, the first roller is moved and positioned in the nipping position while the sheet is laid on the transfer position and before the foil transfer area of the sheet reaches the transfer position, and the state of transport of the foil film is changed to the release state after the first roller gets positioned in the nipping position; and when a sheet of which the foil transfer area is located at a distance shorter than the first distance from a leading edge of the sheet is fed, the first roller is moved and positioned in the nipping position before the sheet reaches the transfer position, and the state of transport of the foil film is changed to the release state after the first roller gets positioned in the nipping position.

The foil transfer device may further comprise an entry section through which to enter information for specifying a location and a length of the foil transfer area in a direction of conveyance of the sheet. Herein, the controller may be configured such that: when the location of the foil transfer area specified through the entry section is outside the surface of a sheet being fed, the conveyor rollers are caused to operate in such a manner that the sheet moves past the transfer position and past the conveyor rollers while the first roller is positioned in the release position, and the conveyor rollers are caused to stop after the sheet moves past the conveyor rollers.

With this additional feature, in which when the location of the foil transfer area specified through the entry section is outside the surface of a sheet being fed, the sheet is ejected without being subjected to the foil transfer, the useless transport of the foil film can be reduced, so that the foil film can be utilized as much as possible and undesirable waste of the foil film can be reduced significantly.

Additionally or alternatively, the controller may be configured to exercise control over the conveyor rollers, the nip/release actuator, and the film-transport regulator in such a manner that: before the foil transfer area of the sheet reaches the transfer position, the first roller is positioned in the nipping position and the state of transport of the foil film is kept in the release state; the state of transport of the foil film is changed from the release state to the restricted state while the sheet of which the foil transfer area has moved past the transfer position remains on the transfer position; and after the state of transport of the foil film is changed to the restricted state, the first roller is moved to the release position.

With this configuration, the transport of the foil film stops while the sheet is laid on the transfer position (i.e., before the sheet exits the transfer position), and thus the foil film which would be wasted if the transport of the foil film stops after the sheet moves past the transfer position can be utilized, so that waste of the foil film can be reduced significantly.

In this configuration, as well, the film-transport regulator may comprise a switching mechanism (e.g., a clutch or a motor) configured as mentioned above. That is, when the operation of the pressure roller and the heating roller is stopped, the state of transport of the foil film is kept in the restricted state, and when the operation of the pressure roller and the heating roller is effected, the state of transport of the foil film is kept in the release state. Herein, the controller may be configured to cause the conveyor rollers in contact with the sheet to stop when causing the switching mechanism to stop the operation of the pressure roller and the heating roller. With this configuration, when the operation (rotation) of the pressure roller and the heating roller being pressed against each other are stopped before the first roller is moved to the release position, the conveyance of the sheet can be stopped, so that undesirable warpage or wrinkling which would occur in the sheet forced to be conveyed while being nipped and held in the transfer position between the first and second rollers not in operation can be avoided.

The foil transfer device as described above may further comprise a sheet sensor having a detecting position located upstream of the heating roller in a direction of conveyance of the sheet and configured to detect a leading edge of the sheet moving past the detecting position. The controller may be configured to make a determination, based on a period of time lapsed from a time of detection of the leading edge of the sheet by the sheet sensor, as to whether or not the foil transfer area of the sheet has moved past the transfer position.

The controller may be configured such that: when a sheet of which the foil transfer area is located at a second distance or farther from a trailing edge of the sheet is fed, the state of transport of the foil film is changed from the release state to the restricted state while the sheet of which the foil transfer area has moved past the transfer position remains on the transfer position, and the first roller is moved to the release position after the state of transport of the foil film is changed to the restricted state; and when a sheet of which the foil transfer area is located at a distance shorter than the second distance from a trailing edge of the sheet is fed, the state of transport of the foil film is changed from the release state to the restricted state after the sheet has moved past the transfer position, and the first roller is moved to the release position after the state of transport of the foil film is changed to the restricted state.

The foil transfer device may further comprise an entry section through which to enter information for specifying a location and a length of the foil transfer area in a direction of conveyance of the sheet. Herein, the controller may be configured such that: when a trailing edge of the foil transfer area of which the location is specified through the entry section is located upstream of a trailing edge of a sheet being fed in the direction of conveyance of the sheet, the state of transport of the foil film is changed from the release state to the restricted state after the sheet has moved past the transfer position, and the first roller is moved to the release position after the state of transport of the foil film is changed to the restricted state.

The controller may be configured to cause the conveyor rollers to convey a first sheet and then convey a second sheet while conveying the first sheet, such that: if a distance from a trailing edge of a first foil transfer area that is the foil transfer area of the first sheet to a trailing edge of the first sheet is equal to or shorter than a predetermined distance, the first roller is kept in the nipping position during a period of time from a time when the first foil transfer area has moved past the transfer position until a second foil transfer area that is the foil transfer area of the second sheet moves past the transfer position; and if the distance from the trailing edge of the first foil transfer area to the trailing edge of the first sheet is longer than the predetermined distance, the state of transport of the foil film is changed from the release state to the restricted state while the first sheet of which the first foil transfer area has moved past the transfer position remains on the transfer position, and the first roller is moved to the release position after the state of transport of the foil film is changed to the restricted state.

If the distance from the trailing edge of the first foil transfer area to the trailing edge of the first sheet is equal to or shorter than the predetermined distance, movement of the first roller to the release position is meaningless. If the distance from the trailing edge of the first foil transfer area to the trailing edge of the first sheet is longer than the predetermined distance, keeping the first roller in the nipping position during a period of time from a time when the first foil transfer area has moved past the transfer position until the second sheet reaches the transfer position would disadvantageously make the amount of transport of the foil film larger.

In contrast, with the configuration mentioned above, when a first sheet of which the first foil transfer area has a trailing edge located at a distance equal to or shorter than the predetermined distance from the trailing edge of the first sheet is conveyed, the controller causes the nip/release actuator to keep the first roller in the nipping position; thus, the meaningless step of separation of the first roller can be omitted. Moreover, when a first sheet of which the first foil transfer area has a trailing edge located at a distance longer than the predetermined distance from the trailing edge of the first sheet is conveyed, the controller causes the nip/release actuator to move the first roller to the release position; thus, the useless transport of the foil film can be reduced, so that the foil film can be utilized as much as possible and waste of the foil film can be reduced significantly.

The above and other aspects, their advantages and further features will become more apparent by describing in detail illustrative, non-limiting embodiments thereof with reference to the accompanying drawings.

Figure 1A:
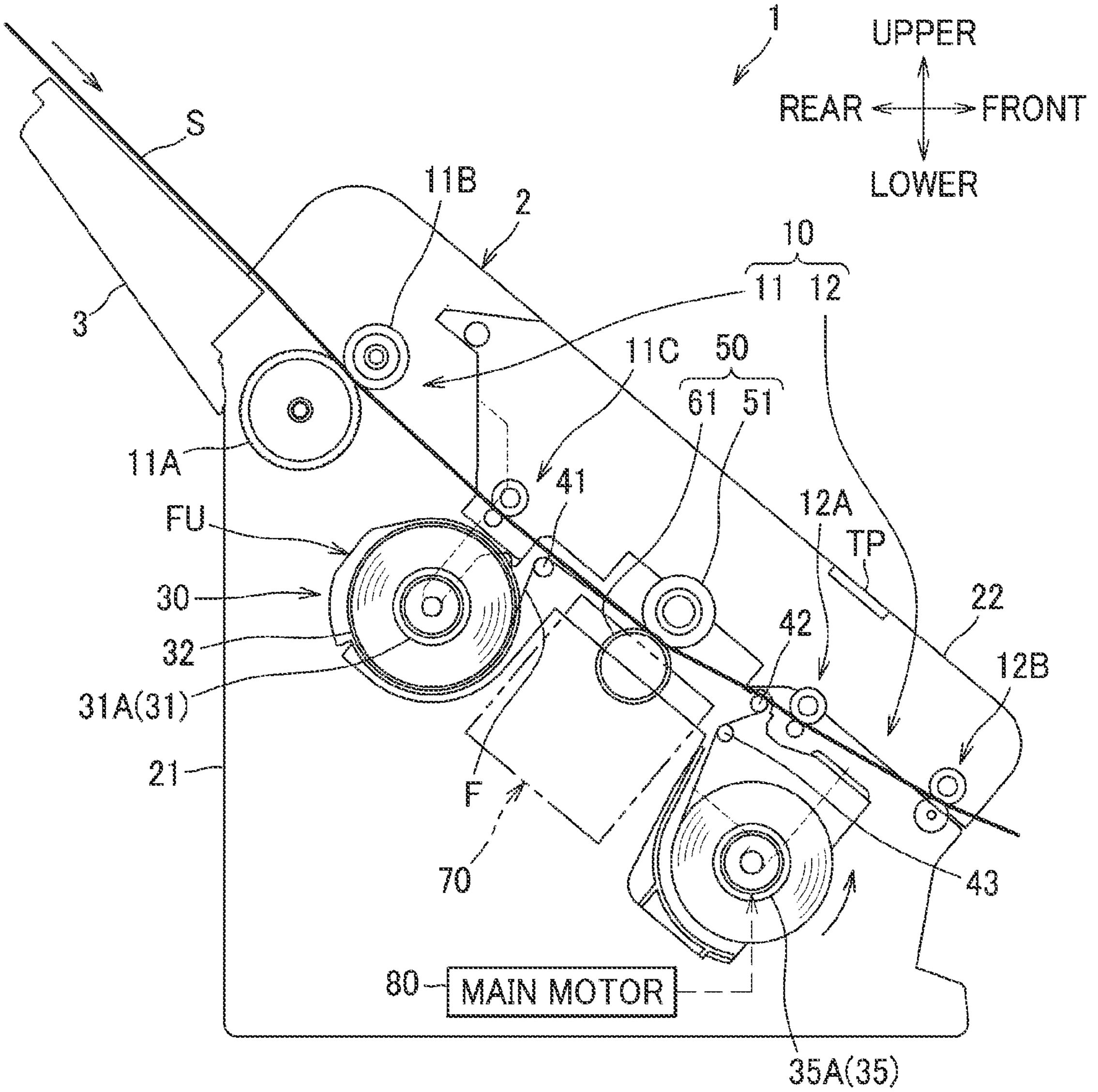
FIG. 1A is a schematic diagram of a foil transfer device.

One illustrative embodiment of the foil transfer device will be described below in detail with reference made to the drawings where appropriate. In the following description, directions will be referred to as directions shown in FIG. 1A. That is, the right-hand side of FIG. 1A is referred to as "front", the left-hand side of FIG. 1A as "rear", the front side of the drawing sheet of FIG. 1A as "left", and the back side of the drawing sheet of FIG. 1A as "right". Similarly, upward/downward directions (upper/lower sides) of FIG. 1A are referred to as "upward/downward (upper/lower)".

As shown in FIG. 1A, a foil transfer device 1 is a device for post-processing to be subjected to a sheet S on which an image is formed (e.g., printed in ink) by an image forming apparatus, for example, a toner image is formed by a laser printer; more specifically, a device for transferring foil such as of aluminum or the like onto the toner image on the sheet S. The foil transfer device 1 thus forms a foil image on the sheet S by transferring foil onto the toner image on the sheet S. The foil transfer device 1 includes a housing 2, a sheet tray 3, a sheet conveyor unit 10, a film supply unit 30, and a transfer unit 50.

The housing 2 is made of plastic or the like, and includes a housing main body 21 and a cover 22. The housing main body 21 has an opening 21A at its upper side (see FIG. 2). The opening 21A is an opening through which to allow a film unit FU as will be described later to be installed into or removed from the housing main body 21. The cover 22 is a member for opening and closing the opening 21A. A rear end portion of the cover 22 is rotatably supported by the housing main body 21. The cover 22 is configured to be rotatable between a closed position in which the opening 21A is closed (position in FIG. 1A) and an open position in which the opening 21A is open (position in FIG. 2).

The sheet tray 3 is a tray on which sheets S such as paper, OHP film, etc., are placed. The sheet tray 3 is provided at a rear portion of the housing 2. The sheets S, with surfaces thereof having toner images formed thereon facing downward, are placed on the sheet tray 3.

The sheet conveyor unit 10 includes a sheet feed mechanism 11 and a sheet ejection mechanism 12. The sheet feed mechanism 11 is a mechanism that conveys sheets S on the sheet tray 3 one by one toward the transfer unit 50. The sheet feed mechanism 11 includes a pickup roller 11A, a retard roller 11B, and an upstream conveyor roller 11C. The pickup roller 11A, the retard roller 11B, and the upstream conveyor roller 11C are examples of conveyor rollers.

The pickup roller 11A is a roller that feeds a sheet S on the sheet tray 3 toward the transfer unit 50. The retard roller 11B is a roller that separates, from other sheets S on the sheet tray 3, one sheet S to be conveyed by the pickup roller 11A.

The retard roller 11B is located above the pickup roller 11A. The retard roller 11B is configured to be rotatable in such a direction that the sheets S stacked on the sheet S to be fed forward by the pickup roller 11A are moved back to the sheet tray 3.

The upstream conveyor roller 11C includes two rollers. A sheet S nipped between the two rollers of the upstream conveyor roller 11C can be conveyed as the rollers rotate. The upstream conveyor roller 11C is located between the pickup roller 11A and the transfer unit 50, and configured to convey a sheet S fed by the pickup roller 11A, to the transfer unit 50.

The sheet ejection mechanism 12 is a mechanism that ejects a sheet S which has passed through the transfer unit 50, to the outside of the housing 2. The sheet ejection mechanism 12 includes a downstream conveyor roller 12A and an ejection roller 12B. The downstream conveyor roller 12A and the ejection roller 12B are examples of the conveyor rollers.

Each of the downstream conveyor roller 12A and the ejection roller 12B includes two rollers. A sheet S nipped between the two rollers of each of the downstream conveyor roller 12A and the ejection roller 12B can be conveyed as the rollers rotate. The downstream conveyor roller 12A is located between the transfer unit 50 and the ejection roller 12B, and configured to convey a sheet S received from the transfer unit 50 to the ejection roller 12B. The ejection roller 12B is located downstream of the downstream conveyor roller 12A in a direction of conveyance of the sheet S, and configured to eject a sheet S forwarded by the downstream conveyor roller 12A to the outside of the housing 2.

The film supply unit 30 is a unit that supplies and lays a foil film F onto a sheet S conveyed from the sheet feed mechanism 11. The film supply unit 30 includes a film unit FU, and a main motor 80.

Figure 2:
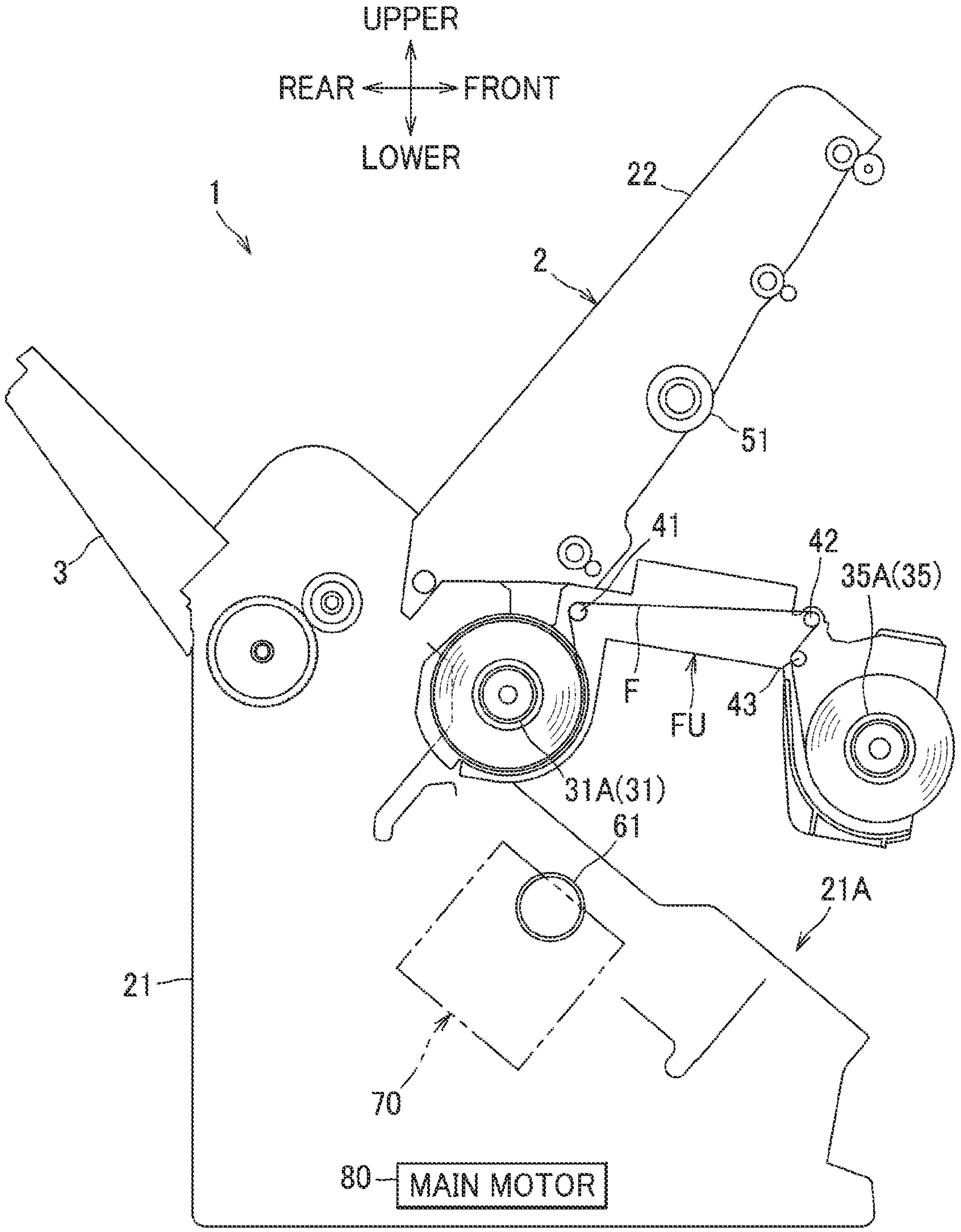
FIG. 2 is a schematic diagram showing an open cover state of the foil transfer device.

The film unit FU is configured, as shown in FIG. 2, to be installable into and removable from the housing main body 21 through the opening 21A along a direction perpendicular to an axial direction of a supply reel 31 which will be described later. The film unit FU includes a supply reel 31, a take-up reel 35, a first guide shaft 41, a second guide shaft 42, and a third guide shaft 43. A foil film F is wound on the supply reel 31 of the film unit FU.

Figure 1B:
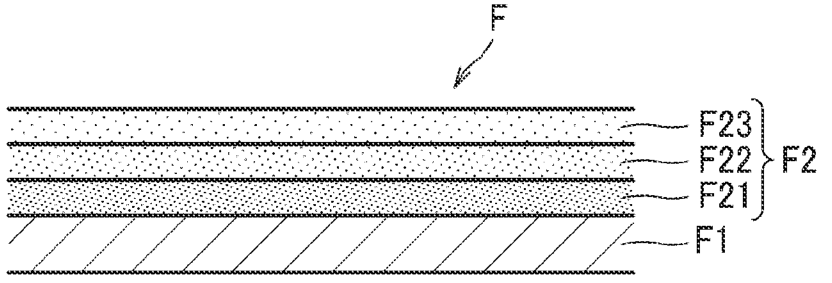
FIG. 1B is a section view showing a layer structure of a foil film.

As shown in FIG. 1B, the foil film F is a film made up of a plurality of layers. To be more specific, the foil film F includes a supporting layer F1 and a supported layer F2. The supporting layer F1 is a transparent substrate in the form of a tape and made of polymeric material, and supports the supported layer F2. The supported layer F2 includes several layers, such as a release layer F21, a transfer layer F22, and an adhesive layer F23. The release layer F21 is a layer for facilitating separation of the transfer layer F22 from the supporting layer F1, and is interposed between the supporting layer F1 and the transfer layer F22. The release layer F21 contains a transparent material, such as a wax-type resin, easily releasable from the supporting layer F1.

The transfer layer F22 is a layer to be transferred onto a toner image, and contains foil. Foil is a thin sheet of metal such as gold, silver, copper, aluminum, etc. The transfer layer F22 contains a colorant of gold-colored, silver-colored, red-colored, or other colored material, and a thermoplastic resin. The transfer layer F22 is interposed between the release layer F21 and the adhesive layer F23.

The adhesive layer F23 is a layer for facilitating adhesion of the transfer layer F22 to a toner image. The adhesive layer F23 contains a material, such as vinyl chloride resin, acrylic resin, etc., which tends to adhere to a toner image heated by the transfer unit 50 which will be described later.

The supply reel 31 is made of plastic or the like, and includes a supply shaft 31A on which a foil film F is wound. One end of the foil film F is fixed to the supply shaft 31A.

The take-up reel 35 is made of plastic or the like, and includes a take-up shaft 35A on which to take up the foil film F. The other end of the foil film F is fixed to the take-up shaft 35A.

It is to be understood that in FIG. 1 or other drawing figures, the supply reel 31 and the take-up reel 35 are illustrated as if the both reels were wound up to the maximum. In actuality, the film unit FU in new condition has its foil film F wound on the supply reel 31 in a roll of a maximum diameter, while no foil film F is wound on the take-up reel 35, or the foil film F is wound on the take-up reel 35 but in a roll of a minimum diameter. When the film unit FU is at the end of its life (i.e., the foil film F has been exhausted), the foil film F is wound on the take-up reel 35 in a roll of a maximum diameter, while no foil film F is wound on the supply reel 31, or the foil film F is wound on the supply reel 31 but in a roll of a minimum diameter.

Each of the first guide shaft 41, the second guide shaft 42, and the third guide shaft 43 is a shaft, made of SUS (stainless steel) or the like, for changing a direction of transport of the foil film F.

The first guide shaft 41 is located upstream of the transfer unit 50 in the direction of conveyance of the sheet S. The first guide shaft 41 changes a direction of transport of the foil film F drawn out from the supply reel 31 and guides the foil film F in a direction substantially parallel to the direction of conveyance of the sheet S.

The foil film F guided by the first guide shaft 41 is transported, with its supported layer F2 (see FIG. 1B) facing upward, toward the transfer unit 50. The sheet S is laid on the foil film F with its supported layer F2 facing upward, and is conveyed together with the foil film F toward the transfer unit 50.

The second guide shaft 42 is located downstream of the transfer unit 50 in the direction of conveyance of the sheet S. The second guide shaft 42 changes a direction of transport of the foil film F having passed through the transfer unit 50 into a direction different from the direction of conveyance of the sheet S, to thereby guide the foil film F in a direction away from the sheet S, so that the foil film F is peeled off from the sheet S.

The third guide shaft 43 defines an angle at which the foil film F is separated from the sheet S (hereinafter referred to as "peel angle"). Herein, the peel angle is an angle formed by a portion of the foil film F stretched between the second guide shaft 42 and the third guide shaft 43 with respect to a portion of the foil film F stretched between the first guide shaft 41 and the second guide shaft 42. The third guide shaft 43 changes a direction of transport of the foil film F guided by the second guide shaft 42 and guides the foil film F to the take-up reel 35.

The transfer unit 50 is a unit that heats and presses the sheet S and the foil film F laid on each other, to transfer the transfer layer F22 onto a toner image formed on a sheet S. The transfer unit 50 includes a pressure roller 51, a heating roller 61, and a nip/release actuator 70. The transfer unit 50 applies heat and pressure to portions of a sheet S and a foil film F laid on each other and nipped between the pressure roller 51 and the heating roller 61.

The pressure roller 51 is a roller comprising a cylindrical metal core with its cylindrical surface coated with a rubber layer made of silicone rubber. The pressure roller 51 is located above the foil film F, and is contactable with a reverse side (opposite to a side on which a toner image is formed) of the sheet S.

The pressure roller 51 has two end portions supported rotatably by the cover 22. The pressure roller 51, which in combination with the heating roller 61, nips the sheet S and the foil film F, is driven to rotate by the main motor 80 and causes the heating roller 61 to rotate accordingly. In this way, the sheet S and the foil film F nipped between the pressure roller 51 and the heating roller 61 are conveyed according as the pressure roller 51 and the heating roller 61 rotate. In other words, the pressure roller 51 is configured to rotate, with the foil film F and the sheet S being nipped between the heating roller 61 and the pressure roller 51, to thereby cause the sheet S to move forward together with the foil film F drawn out from the supply reel 31 and guided by the first guide shaft 41. It is to be understood that the heating roller 61, instead of the pressure roller 51, may be configured to be driven to rotate by the main motor 80 and cause the pressure roller 51 to rotate accordingly.

The heating roller 61 is a roller comprising a cylindrical metal tube with a heater located inside, to heat the foil film F and the sheet S. The heating roller 61 is located under the foil film F, and is in contact with the foil film F.

The nip/release actuator 70 is a mechanism configured to switch a state of the pressure roller 51 and the heating roller 61 to a nip state in which the foil film F is nipped between the pressure roller 51 and the heating roller 61 and to a release state in which at least one of the rollers 51, 61 is located apart from the foil film F. In the present embodiment, the nip/release actuator 70 causes the heating roller 61 to move between a nipping position indicated by a solid line in FIG. 6 and a release position indicated by a phantom line in FIG. 6, to thereby bring the heating roller 61 into and out of contact with the foil film F. Herein, the nipping position is a position in which the heating roller 61 is pressed against the pressure roller 51, and the release position is a position in which the heating roller 61 is separated from the pressure roller 51.

With the foil transfer device 1 configured as described above, sheets S stacked on the sheet tray 3 with front surfaces facing downward are fed and conveyed one by one toward the transfer unit 50 by the sheet feed mechanism 11. Each sheet S is laid on a foil film F supplied from the supply reel 31 at a position upstream of the transfer unit 50 in the direction of conveyance of the sheet S, and conveyed to the transfer unit 50 with a toner image of the sheet S being kept in contact with the foil film F.

In the transfer unit 50, the sheet S and the foil film F nipped and passing through between the pressure roller 51 and the heating roller 61 are heated and pressed by the heating roller 61 and the pressure roller 51, so that the transfer layer F22 is transferred onto a toner image.

After the foil transfer is complete, the sheet S and the foil film F adhered to each other are conveyed to the second guide shaft 42. When the sheet S and the foil film F travels past the second guide shaft 42, the direction of transport of the foil film F is changed into a direction different from the direction of conveyance of the sheet S; thereby the foil film F is peeled from the sheet S.

The foil film F peeled from the sheet S is taken up on the take-up reel 35. On the other hand, the sheet S from which the foil film F is peeled has a foil transferred surface facing downward and is ejected to the outside of the housing 2 by the sheet ejection mechanism 12.

Figure 3:
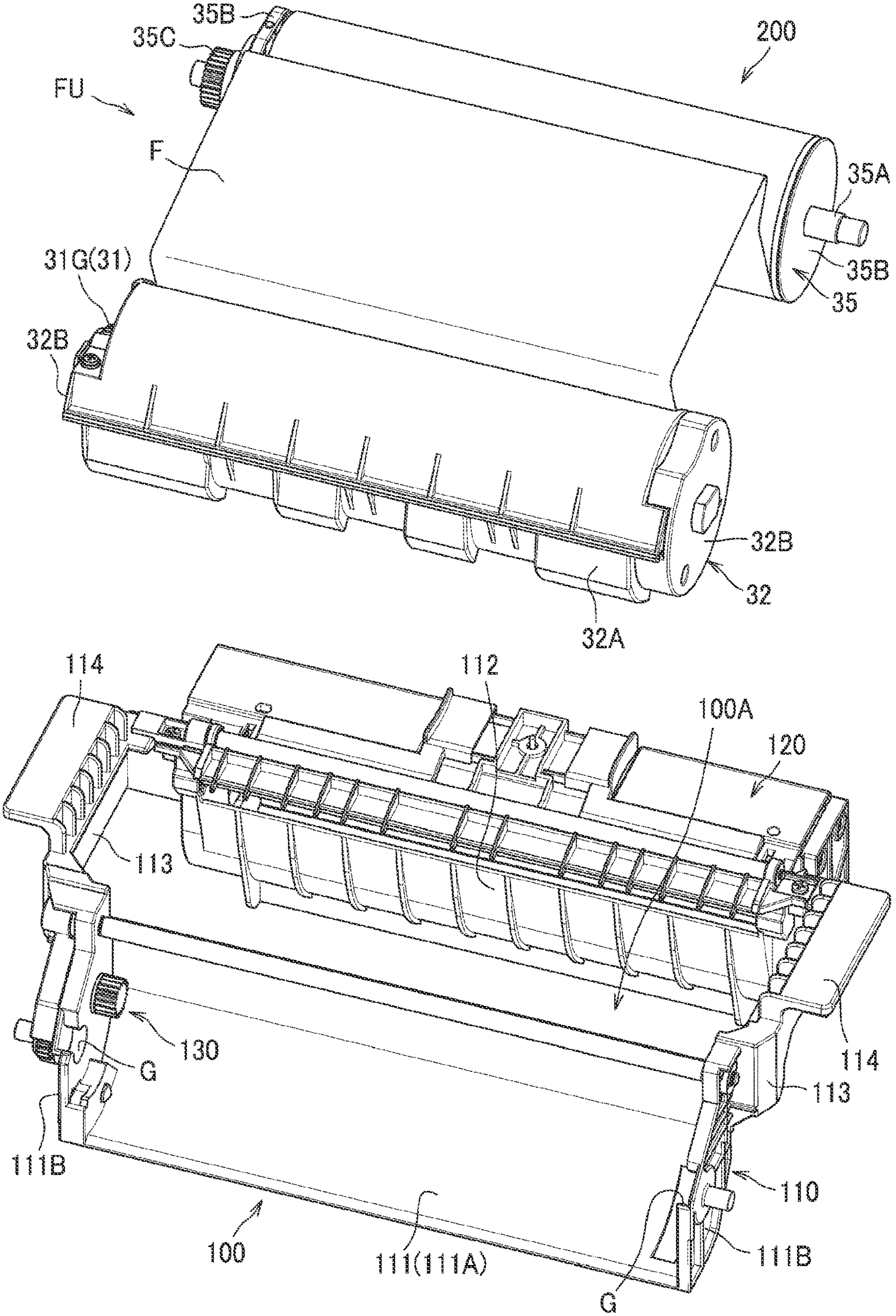
FIG. 3 is an exploded perspective view of a film unit.

As shown in FIG. 3, the film unit FU includes a holder 100 made of plastic or the like, and a film cartridge 200 installable into and removable from the holder 100. The film cartridge 200 includes the supply reel 31 and the take-up reel 35 described above on which a foil film F is wound, and a supply case 32.

The supply reel 31 (more specifically, the supply case 32) and the take-up reel 35 are installable into and removable from the holder 100 in directions perpendicular to the axial direction of the supply reel 31. The film cartridge 200 installed in the holder 100 is configured to be installable into and removable from the housing main body 21.

The supply case 32 is a hollow case accommodating the supply reel 31. The supply case 32 is made of plastic or the like, and includes an outer peripheral wall 32A having a generally cylindrical shape, and two side walls 32B each having a generally discoidal shape. The two side walls 32B are provided at both ends of the outer peripheral wall 32A. The supply reel 31 is rotatably supported by the respective side walls 32B of the supply case 32.

The holder 100 includes a base frame 110 and a pivotal frame 120 pivotally (movably) supported by the base frame 110. The base frame 110 includes a first holding portion 111, a second holding portion 112, two connecting portions 113 and two handles 114.

The first holding portion 111 is a portion that holds the supply case 32. The first holding portion 111 holds the supply reel 31 via the supply case 32. The first holding portion 111 includes an outer peripheral wall 111A having a substantially arcuate shape in cross section, and two side walls 111B.

The outer peripheral wall 111A is located along the outer peripheral surface of the supply case 32. The side walls 111B are located at respective ends of the outer peripheral wall 111A facing outward in the axial direction of the supply reel 31.

Each of the side walls 111B has an installation/removal guide G for guiding the supply case 32 when the supply case 32 is installed and removed. A gearing system 130 is provided at one of the two side walls 111B. The gearing system 130 is a mechanism for imposing on the supply reel 31 a load of a supply side torque limiter TL2 (see FIG. 6) provided in the housing main body 21. The structure of the gearing system 130 will be described later.

The second holding portion 112 is a portion that holds the take-up reel 35. To be more specific, the second holding portion 112 is combined with the pivotal frame 120 to make up a hollow case, and the take-up reel 35 is accommodated in the hollow case.

The two connecting portions 113 are portions that connect the first holding portion 111 and the second holding portion 112. To be more specific, the connecting portions 113 are arranged apart from each other in the axial direction of the supply reel 31.

With the connecting portions 113 being formed in this way, the holder 100 is provided with a through hole 100A extending in a direction perpendicular to the axial direction of the supply reel 31. The handles 114 are provided on respective connecting portions 113.

The supply reel 31 includes a supply gear 31G provided at an end of the supply shaft 31A facing outward in a direction parallel to the axial direction of the supply reel 31. The supply gear 31G is exposed to outside through a cutaway opening formed in the supply case 32. The supply gear 31G is configured to be engageable with the gearing system 130 mentioned above when the film cartridge 200 is installed in the holder 100.

The take-up reel 35 includes, in addition to the take-up shaft 35A described above, two flanges 35B, and a take-up gear 35C. The flanges 35B are portions for restraining widthwise movement of the foil film F wound on the take-up shaft 35A. The flanges 35B are each formed in a shape of a disc having a diameter larger than that of the take-up shaft 35A, and provided at both end portions of the take-up shaft 35A.

The take-up gear 35C is a gear that receives a mechanical power from the main motor 80 provided in the foil transfer device 1, for transmitting the mechanical power to the take-up shaft 35A. The take-up gear 35C is located on an outside of the flange 35B, outward in a direction parallel to the axial direction. The take-up gear 35C is located coaxially with the take-up shaft 35A.

Figure 4:
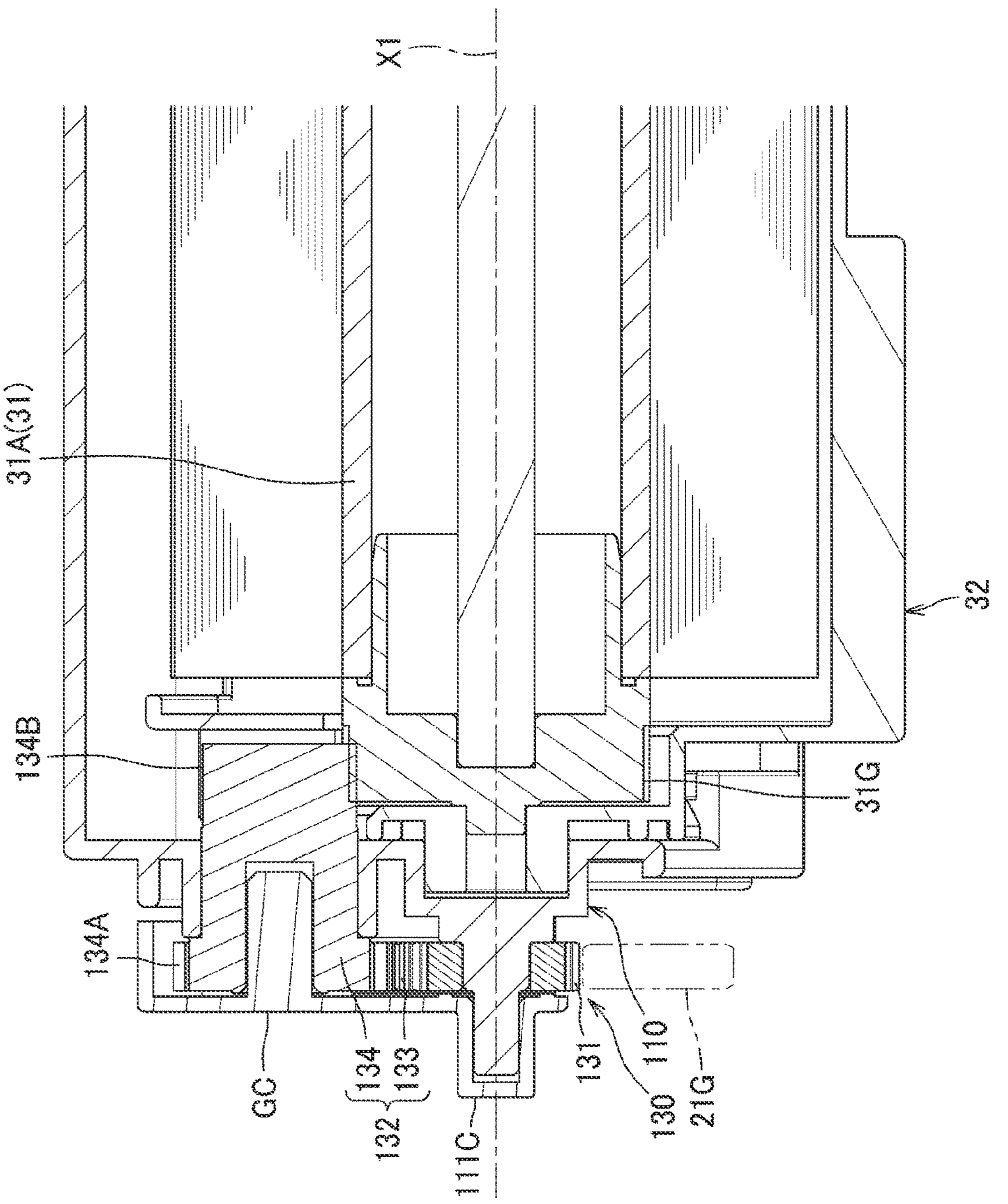
FIG. 4 is a section view showing a structure of part of the film unit around one of two ends of the supply reel apart from each other in an axial direction of the supply reel.

As shown in FIG. 4, the gearing system 130 for imposing a load on the supply reel 31 includes a frame gear 131 and a gear train 132. The frame gear 131 is a gear that engages with a housing gear 21G provided in the housing main body 21. The frame gear 131 is connected to a supply side torque limiter TL2, which will be described below, or the like via the housing gear 21G.

The gear train 132 is a gear train that connects the frame gear 131 and the supply gear 31G. The gear train 132 includes a first gear 133 and a second gear 134. The first gear 133 engages with the frame gear 131. The second gear 134 is a two-stage gear cluster and includes a large-diameter gear 134A and a small-diameter gear 134B.

The large-diameter gear 134A is a gear having a diameter larger than a diameter of the small-diameter gear 134B. The large-diameter gear 134A engages with the first gear 133. The small-diameter gear 134B engages with the supply gear 31G.

Figure 5:
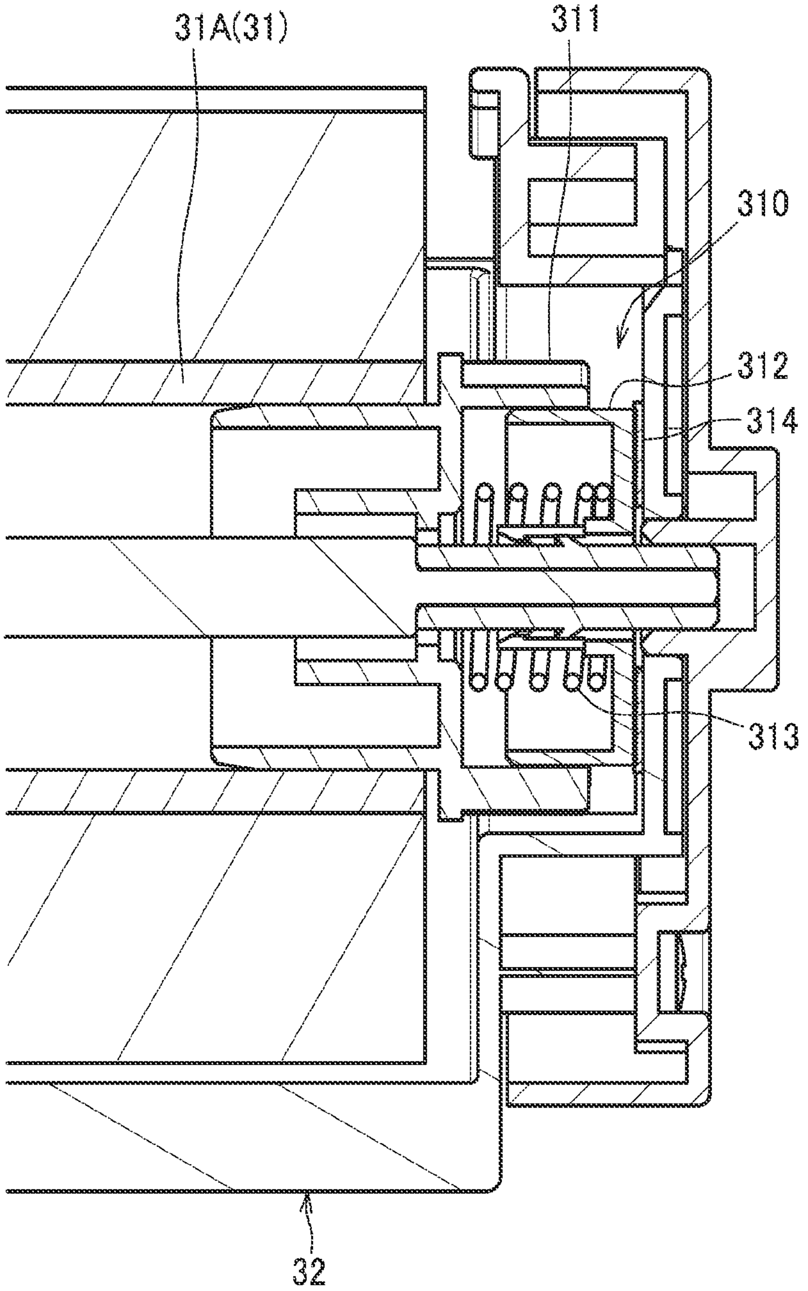
FIG. 5 is a section view showing a structure of part of a film cartridge around the other of the two ends of the supply reel.

As shown in FIG. 5, at the other end of the supply shaft 31A facing outward in a direction parallel to the axial direction of the supply reel 31 (that is, an end opposite to the end at which the supply gear 31G is provided), a first load imposing mechanism 310 is provided. The first load imposing mechanism 310 is a mechanism that imposes a first loading torque LT1 on the supply reel 31 by generating a frictional force between the supply reel 31 and the supply case 32 by which the supply reel 31 is rotatably supported.

The first load imposing mechanism 310 includes an anchor member 311, a movable member 312, a coil spring 313, and a friction pad 314. The supply shaft 31A of the supply reel 31 has a hollow cylindrical shape, and the anchor member 311 is fitted in the inner cylindrical surface of the supply shaft 31A and fixed to the supply reel 31. The movable member 312 is supported by the anchor member 311 movably in the axial direction relative to the anchor member 311 and rotatably together with the anchor member 311. The coil spring 313 is located between the anchor member 311 and the movable member 312. The friction pad 314 is located between the movable member 312 and the supply case 32 and fixed to the supply case 32. The movable member 312 is biased by the coil spring 313 outward in the axial direction of the supply reel 31, and pressed against the friction pad 314.

Accordingly, when the supply reel 31 rotates, a frictional force is produced between the movable member 312 and the friction pad 314, so that the first loading torque LT1 is imposed by the first load imposing mechanism 310 on the supply reel 31.

Figure 6:
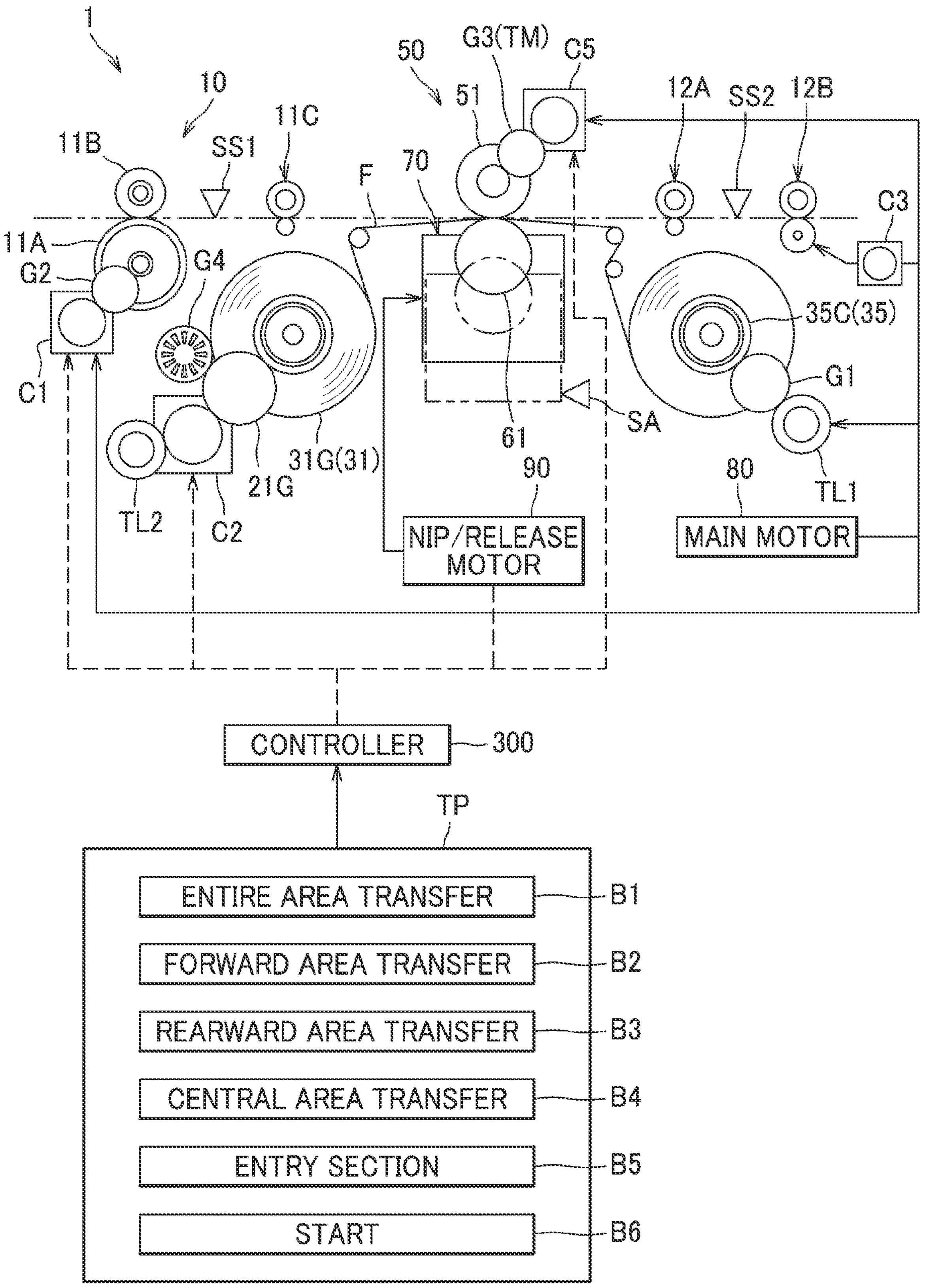
FIG. 6 is a simplified view showing a structure of the foil transfer device.

As shown in FIG. 6, the driving force (mechanical power) generated by the main motor 80 is not only transmitted to the take-up reel 35 and the pressure roller 51 as described above, but also to the sheet conveyor unit 10. Here, in FIG. 6, the structure of the foil transfer device 1 is simplified and schematically illustrated for convenience's sake.

As a mechanism for transmitting the mechanical power generated by the main motor 80 to the take-up reel 35, the foil transfer device 1 mainly includes a take-up side torque limiter TL1 and a gear G1. The take-up side torque limiter TL1 has a function of limiting a driving torque DT generated by the main motor 80 and exerted on the take-up reel 35 to a value not greater than a predetermined value.

The take-up side torque limiter TL1 is connected via gearing (not shown) to the main motor 80. The take-up side torque limiter TL1 is connected via the gear G1 to the take-up gear 35C.

As a mechanism for transmitting the mechanical power generated by the main motor 80 to the sheet conveyor unit 10, the foil transfer device 1 mainly includes a pickup clutch C1, a gear G2, and a conveyor clutch C3. The pickup clutch C1 is an electromagnetic clutch for switching a state of transmission of the mechanical power from the main motor 80 to the pickup roller 11A between a transmitting state and a shut-off state.

The pickup clutch C1 is connected via gearing (not shown) to the main motor 80. The pickup clutch C1 is connected via a gear G2 to the pickup roller 11A.

Among several rollers that make up the sheet conveyor unit 10, rollers other than the pickup roller 11A (i.e., rollers 11B, 11C, 12A, and 12B) are connected via the conveyor clutch C3 and gearing (not shown) to the main motor 80. The conveyor clutch C3 is an electromagnetic clutch for switching a state of transmission of the mechanical power generated by the main motor 80 to the rollers 11B, 11C, 12A, and 12B between a transmitting state in which the mechanical power from the main motor 80 is transmitted to the rollers 11B, 11C, 12A, and 12B and a shut-off state in which the transmission of the mechanical power to the rollers 11B, 11C, 12A, and 12B is shut off. Accordingly, if the conveyor clutch C3 is switched to a connecting state, i.e., the transmitting state, then the rollers 11B, 11C, 12A, and 12B are caused to rotate, while if the conveyor clutch C3 is switched to a disconnecting state, i.e., the shut-off state, then the rollers 11B, 11C, 12A, and 12B are caused to stop rotation.

As a mechanism for transmitting the mechanical power generated by the main motor 80 to the pressure roller 51, the foil transfer device 1 mainly includes a transmission mechanism TM and a roller clutch C5. The roller clutch C5 is an example of a switching mechanism. The transmission mechanism TM includes a gear G3 for transmitting the mechanical power from the roller clutch C5 to the pressure roller 51, and gearing (not shown) for transmitting the mechanical power from the main motor 80 to the roller clutch C5.

The roller clutch C5 is an electromagnetic clutch capable of switching a state of the transmission mechanism TM to a transmitting state in which the mechanical power is transmitted to the pressure roller 51 and to a shut-off state in which transmission of the mechanical power to the pressure roller 51 is shut off. In other words, the roller clutch C5 is configured to selectively effect and stop operation (rotation) of the pressure roller 51 and the heating roller 61 which is driven by the rotating pressure roller 51. To be more specific, when the mechanical power is transmitted to the pressure roller 51, the heating roller 61 is caused to rotate accordingly. When the transmission of the mechanical power to the pressure roller 51 is shut off, the pressure roller 51 stops rotating, and as a consequence the heating roller 61 as well is caused to stop rotating.

The foil transfer device 1 further includes a supply side torque limiter TL2, a reel clutch C2, a nip/release motor 90, a touch panel TP, and a controller 300. The touch panel TP is an example of an operating unit.

The supply side torque limiter TL2 is a member for imposing a second loading torque LT2 on the supply reel 31. Herein, the second loading torque LT2 has a set value greater than a value obtained by subtracting the aforementioned first loading torque LT1 from the driving torque DT exerted on the take-up reel 35. The aforementioned first loading torque LT1 has a set value smaller than the driving torque DT exerted on the take-up reel 35. The supply side torque limiter TL2 serves as a load imposing device to impose a loading torque LT on the supply reel 31. The supply side torque limiter TL2 and the reel clutch C2 that operate in cooperation implements a torque changer capable of turning a balance between a loading torque LT exerted on the supply reel 31 and the driving torque DT exerted on the take-up reel 35.

The supply side torque limiter TL2 is connected to the reel clutch C2. The reel clutch C2 is an electromagnetic clutch capable of changing a state of connection between the supply side torque limiter TL2 and the supply reel 31. The magnitude of the loading torque LT exerted on the supply reel 31 is changed by the reel clutch C2 changing the state of connection between the supply side torque limiter TL2 and the supply reel 31. To be more specific, when the supply side torque limiter TL2 is disconnected from the supply reel 31, the loading torque LT exerted on the supply reel 31 takes on the first loading torque LT1 that is a value smaller than the driving torque DT. On the other hand, when the supply side torque limiter TL2 is connected to the supply reel 31, the loading torque LT exerted on the supply reel 31 takes on a value obtained by adding the second loading torque LT2 to the first loading torque LT1, and this value is greater than the driving torque DT.

The reel clutch C2 is connected via the housing gear 21G and the aforementioned gearing system 130 (not shown) to the supply gear 31G. The housing gear 21G is in mesh with an encoding gear G4. The encoding gear G4 includes a rotary disc having a plurality of slits formed therein, as an element of a rotary encoder which further includes, for example, a light source and an optical sensor though not illustrated so that a light beam emitted from the light source passes through slits in the rotary disc of the encoding gear G4 and is detected by the optical sensor. Accordingly, the rotational speed of the supply reel 31 can be determined.

The nip/release motor 90 is a motor configured to cause the nip/release actuator 70 to operate and switch the state of the pressure roller 51 and the heating roller 61 to the nip state and to the release state. In the vicinity of the nip/release actuator 70, a position sensor SA is provided to detect the position of the heating roller 61 set by the nip/release actuator 70. The position sensor SA may, for example, be an optical sensor.

A first sheet sensor SS1 as an example of a sheet sensor is provided between the pickup roller 11A and the upstream conveyor roller 11C. The first sheet sensor SS1 has a detecting position located upstream of the heating roller 61 in the direction of conveyance of the sheet S. The first sheet sensor SS1 is configured to detect a sheet S conveyed toward the transfer unit 50 when the sheet S goes past the first sheet sensor SS1 (i.e., past the detecting position thereof). A second sheet sensor SS2 is provided between the downstream conveyor roller 12A and the ejection roller 12B. The second sheet sensor SS2 is configured to detect a sheet S conveyed from the transfer unit 50 when the sheet S goes past the second sheet sensor SS2.

Each of the first sheet sensor SS1 and the second sheet sensor SS2 may be configured, for example, to include a lever that turns about a pivot upon contact with a sheet S, and an optical sensor that detects the position of the lever. With this configuration, the first sheet sensor SS1 can detect that a leading edge of a sheet S goes past the first sheet sensor SS1 and that a trailing edge of the sheet S goes past the first sheet sensor SS1; similarly, the second sheet sensor SS2 can detect that the leading edge of the sheet S goes past the second sheet sensor SS2 and that the trailing edge of the sheet S goes past the second sheet sensor SS2.

When a sheet S comes in contact with the lever of the first sheet sensor SS1, the lever is caused to turn to a first position. While the sheet S is in contact with the lever, the lever is kept in the first position. When the sheet S goes past the first sheet sensor SS1, and comes out of contact with the lever, the lever is caused to turn to a second position. Since the period of time for which the lever of the first sheet sensor SS1 is in contact with a sheet S and thus is in the first position is directly proportional to the length of the sheet S in the direction of conveyance of the sheet S, the length of the sheet S in the direction of conveyance of the sheet S can be determined from detection signals of the first sheet sensor SS1, more specifically, based on times of detection of the leading and trailing edges of the sheet S by the first sheet sensor SS1.

In order to avoid sagging of the foil film F between the roller 51, 61 (specifically, the transfer position at which a sheet S is to be nipped between the pressure roller 51 and the heating roller 61 and caused to move forward together with the foil film F by the pressure roller 51 and the heating roller 61) and the take-up reel 35, the peripheral velocity of the take-up reel 35 (i.e., peripheral velocity of a roll of the foil film F being wound on the take-up shaft 35A) is set at a velocity greater than the peripheral velocity of the pressure roller 51. To be more specific, the transmission mechanism TM for transmitting the mechanical power generated by the main motor 80 to the pressure roller 51 and the mechanism for transmitting the mechanical power generated by the main motor 80 to the take-up reel 35 are configured to meet the aforementioned criterion of the peripheral velocities.

When the foil film F is nipped between the pressure roller 51 and the heating roller 61, the rotation of the take-up shaft 35A is restricted by the peripheral velocity of the pressure roller 51; thus, during the foil transfer, the actual peripheral velocity of the take-up reel 35 (of the roll of the multilayer film F being wound on the take-up shaft 35A) is substantially equal to the actual peripheral velocity of the pressure roller 51. Therefore, the aforementioned peripheral velocity of the take-up reel 35 is a hypothetical peripheral velocity as assumed to be measured if the foil film F travels with the loading torque LT smaller than the driving torque DT under the release state in which at least one of the pressure roller 51 and the heating roller 61 is located apart from the foil film F. It is understood that the peripheral velocity of the take-up shaft 35A in the actual control process would not take on such a hypothetical peripheral velocity.

In the present embodiment, the aforementioned torque changer (the supply side torque limiter TL2 and the reel clutch C2) and the switching mechanism (the roller clutch C5) operate in combination and function as a film-transport regulator. The film-transport regulator is configured to be capable of changing a state of transport of the foil film F drawn out from the supply reel 31 by the heating roller 61 and the pressure roller 51, between a restricted state in which restriction is placed on the transport of the foil film F and a release state in which the restriction is removed.

To be more specific, when the nip/release actuator 70 keeps the state of the pressure roller 51 and the heating roller 61 in the release state, regardless of the state of the roller clutch C5, if the reel clutch C2 is switched to a connecting state to result in LT>DT, then the film-transport regulator changes the state of transport of the foil film F to the restricted state, while if the reel clutch C2 is switched to a disconnecting state to result in LT<DT, then the film-transport regulator changes the state of transport of the foil film F to the release state. On the other hand, when the nip/release actuator 70 keeps the state of the pressure roller 51 and the heating roller 61 in the nip state and the reel clutch C2 has been switched to the disconnecting state to result in LT<DT, if the roller clutch C5 is switched to a disconnecting state, i.e., a shut-off state, then the film-transport regulator changes the state of transport of the foil film F to the restricted state, while if the roller clutch C5 is switched to a connecting state, i.e., the transmitting state, then the film-transport regulator changes the state of transport of the foil film F to the release state. In other words, when the heating roller 61 and the pressure roller 51 are pressed against each other under the condition of LT<DT, if the pressure roller 51 and the heating roller 61 are caused to stop rotating, then the state of transport of the foil film F is changed to the restricted state in which the foil film F is not drawn out from the supply reel 31 by the heating roller 61 and the pressure roller 51, while if the pressure roller 51 and the heating roller 61 are caused to rotate, then the state of transport of the foil film F is changed to the release state in which the foil film F is drawn out from the supply reel 31 by the heating roller 61 and the pressure roller 51.

The touch panel TP is a panel that displays buttons or the like to be touched by a user for giving instructions on operation or a choice from options, to the controller 300. The touch panel TP is provided, for example, on a top surface of the cover 22 as shown in FIG. 1.

The touch panel TP is configured to display a first button B1, a second button B2, a third button B3, a fourth button B4, an entry section B5, and a start button B6. The first button B1 is a selection button for execution of a foil transfer process in an entire area transfer mode. The second button B2 is a selection button for execution of the foil transfer process in a forward area transfer mode. The third button B3 is a selection button for execution of the foil transfer process in a rearward area transfer mode. The fourth button B4 is a selection button for execution of the foil transfer process in a central area transfer mode. The entry section comprises a plurality of buttons for changing numbers and other data shown in the touch panel TP. The start button B6 is a button for starting execution of the foil transfer process.

The transfer modes mentioned above define foil transfer areas TA (see FIG. 7A) different in length or location on a surface of a sheet S in the direction of conveyance of the sheet S. The foil transfer area TA is defined on the surface of each sheet as an area in which foil is to be transferred.

Specifically, the entire area transfer mode is a mode in which the foil transfer process is subjected to an entire area of the sheet S; that is, the foil transfer area TA is located at a distance shorter than a first distance from a leading edge of the sheet S and at a distance shorter than a second distance from a trailing edge of the sheet S. Herein, the first distance and the second distance may be, for example, approximately one-third the length of the sheet S in the direction of conveyance of the sheet S.

The forward area transfer mode is a mode in which the foil transfer process is subjected to only a forwardly off-centered part of the surface of the sheet S (i.e., closer to the leading edge and farther from the trailing edge) or on a front side with respect to the center of the sheet S in the direction of conveyance of the sheet S. In other words, the foil transfer area TA onto which the foil F (transfer layer F22) is to be transferred in the forward area transfer mode is located at a distance shorter than the first distance from the leading edge of the sheet S and at the second distance or farther from the trailing edge of the sheet S.

The rearward area transfer mode is a mode in which the foil transfer process is subjected to only a rearwardly off-centered part of the surface of the sheet S (i.e., closer to the trailing edge and farther from the leading edge) with respect to the center of the sheet S in the direction of conveyance of the sheet S. In other words, the foil transfer area TA onto which the foil F (transfer layer F22) is to be transferred in the rearward area transfer mode is located at the first distance or farther from the leading edge of the sheet S and at a distance shorter than the second distance from the trailing edge of the sheet S.

The central area transfer mode is a mode in which the foil transfer process is subjected to only a central part of the surface of the sheet S. In other words, the foil transfer area TA onto which the foil F (transfer layer F22) is to be transferred in the central area transfer mode is located at the first distance or farther from the leading edge of the sheet S and at the second distance or farther from the trailing edge of the sheet S.

In this embodiment, the dimensions of the foil transfer area TA are predetermined as desired. The length of the foil transfer area TA in the direction of conveyance of the sheet S may assume a fixed value set for each transfer mode. For example, the foil transfer area TA set in the entire area transfer mode may have approximately the same length as the length of the sheet S, while the foil transfer area TA set in each of the other area transfer modes may have approximately one-third the length of the sheet S. The foil transfer area TA set in each transfer mode may have approximately the same width (dimension in a direction perpendicular to the direction of conveyance of the sheet S) as the width (dimension in a direction perpendicular to the direction of the length) of the sheet S.

A user can set any one of the transfer modes by touching a corresponding button chosen among the buttons B1 to B4 displayed on the touch panel TP.

When the user touches the start button B6 on the touch panel TP with one transfer mode being chosen, the touch panel TP outputs to the controller 300 an instruction for executing foil transfer in the chosen transfer mode and pieces of information on the foil transfer area TA. In the following description, an instruction to be outputted to the controller 300 when the entire area transfer mode has been chosen will be referred to as "entire area transfer instruction", and an instruction to be outputted to the controller 300 when the forward area transfer mode has been chosen will be referred to as "forward area transfer instruction". Similarly, an instruction to be outputted to the controller 300 when the rearward area transfer mode has been chosen will be referred to as "rearward area transfer instruction", and an instruction to be outputted to the controller 300 when the central area transfer mode has been chosen will be referred to as "central area transfer instruction".

The controller 300 includes a central processing unit (CPU), a random-access memory (RAM), a read-only memory (ROM), and an input/output processor circuit. The controller 300 executes processes of control by performing a variety of computations and operations based on programs and data stored in the ROM, etc. The controller 300 is configured to be capable of executing a foil transfer process in any one the modes described above based on instructions outputted from the touch panel TP.

The controller 300 is configured to be capable of exercising control over the conveyor rollers 11A, 11B, 11C, 12A and 12B, the nip/release actuator 70, and the film-transport regulator, upon receipt of a transfer instruction of each transfer mode, in such a manner that: the sheet S fed by the conveyor rollers 11A, 11B and 11C reaches the transfer position in which the foil film F and the sheet S are to be nipped between the heating roller 61 and the pressure roller 51, while the heating roller 61 is positioned in the release position and the state of transport of the foil film F is kept in the restricted state (i.e., under the condition of the relative torques: LT>DT). Thereafter, the controller 300 executes processes according to the transfer mode set in the received transfer instruction.

Processes in respective transfer modes will be briefly described below with reference to FIGS. 7A, 7B, 7C and 7D. It is to be understood that in the initial state where the foil transfer is not being executed, the heating roller 61 is positioned in the release position, the pressure roller 51 is stopped, and the relative torques satisfy the condition of: LT>DT.

Figure 7A:
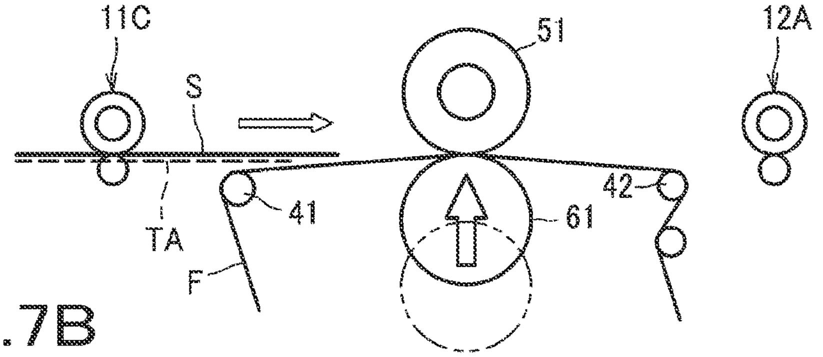
FIGS. 7A, 7B, 7C and 7D are diagrams for clarifying distinction among an entire area transfer process, a forward area transfer process, a rearward area transfer process, and a central area transfer process.

As shown in FIG. 7A, in the pre-transfer process of control in the entire area transfer mode (control exercised before foil transfer onto the foil transfer area TA), before the leading edge of the sheet S reaches the transfer position between the heating roller 61 and the pressure roller 51, the controller 300 causes the conveyor rollers 11A, 11B, 11C, 12A and 12B to stop, to thereby stop conveyance of the sheet S. Thereafter, the controller 300 causes the nip/release actuator 70 to move the heating roller 61 from the release position to the nipping position. In this way, by stopping the conveyance of the sheet S before the leading edge of the sheet S reaches the transfer position, the controller 300 causes the heating roller 61 to be moved and positioned in the nipping position by the nip/release actuator 70 before the sheet S reaches the transfer position.

After the heating roller 61 gets positioned in the nipping position, the controller 300 changes the condition of relative torques to LT<DT by switching the reel clutch C2 to the disconnecting state, causes the conveyor rollers 11A, 11B, 11C, 12A and 12B to operate by switching the pickup clutch C1 and the conveyor clutch C3 to the connecting state, and causes the pressure roller 51 to rotate by switching the roller clutch C5 to the connecting state, so that the sheet S is caused to move forward together with the foil film F for execution of foil transfer onto the foil transfer area TA. In this way, the controller 300 causes the film-transport regulator to change the state of transport of the foil film F to the release state (i.e., causes the foil film F to be transported) after the heating roller 61 gets positioned in the nipping position.

Figure 7B:
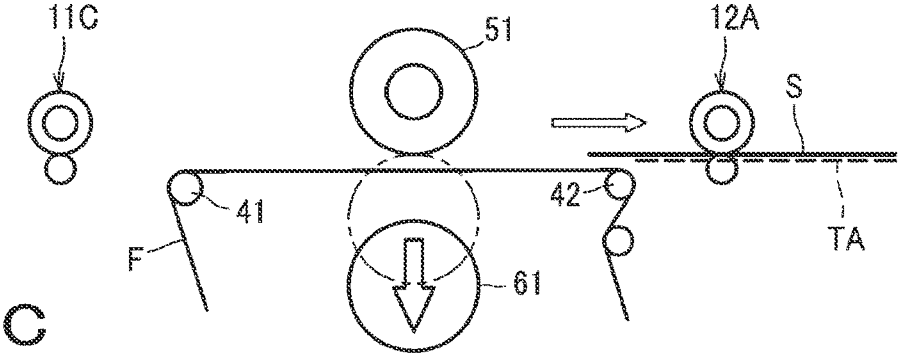

As shown in FIG. 7B, in the post-transfer process of control in the entire area transfer mode (control exercised after foil transfer onto the foil transfer area TA), after the trailing edge of the sheet S goes past the foil transfer position, the controller 300 causes the conveyor rollers 11A, 11B, 11C, 12A and 12B and the pressure roller 51 to stop operating by switching the pickup clutch C1, the conveyor clutch C3 and the roller clutch C5 to the disconnecting state respectively, to stop the conveyance of the sheet S and the transport of the foil film F. Thereafter, the controller 300 changes the condition of relative torques to LT>DT by switching the reel clutch C2 to the connecting state and causes the nip/release actuator 70 to move the heating roller 61 from the nipping position to the release position. Thereafter, the controller 300 causes the conveyor rollers 11A, 11B, 11C, 12A and 12B to restart operation by switching the pickup clutch C1 and the conveyor clutch C3 to the connecting state, so that the sheet S is ejected to the outside of the housing 2.

Figure 7C:
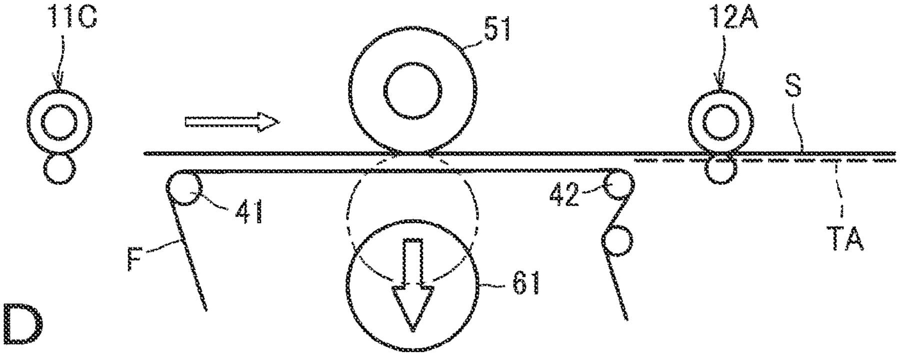

The pre-transfer process of control in the forward area transfer mode is the same as the pre-transfer process of control in the entire area transfer mode (see FIG. 7A). As shown in FIG. 7C, in the post-transfer process of control in the forward area transfer mode, unlike the corresponding process of control in the entire area transfer mode, the controller 300 causes the conveyor rollers 11A, 11B, 11C, 12A and 12B and the pressure roller 51 to stop operating (rotating) to stop the conveyance of the sheet S and the transport of the foil film F while the sheet S of which the foil transfer area TA has moved past the transfer position remains on the transfer position. In other words, the controller 300 causes the film-transport regulator to change the state of transport of the foil film F from the release state to the restricted state to stop the transport of the foil film F while the sheet S of which the foil transfer area TA has moved past the transfer position remains on the transfer position. Thereafter, the controller 300 executes the same process steps as those of the post-transfer process of control in the entire area transfer mode.

Figure 7D:
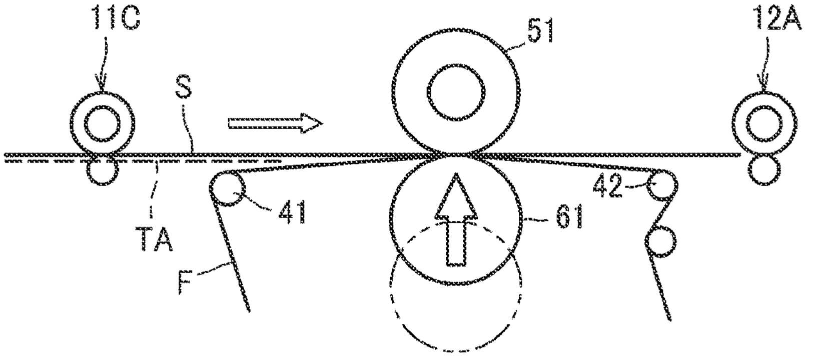

As shown in FIG. 7D, in the pre-transfer process of control in the rearward area transfer mode, unlike the corresponding process of control in the entire area transfer mode, the controller 300 causes the conveyor rollers 11A, 11B, 11C, 12A and 12B to stop rotating, to thereby stop the conveyance of the sheet S, while the sheet S is laid on the transfer position and before the foil transfer area TA of the sheet S reaches the transfer position. Thereafter, the controller 300 causes the nip/release actuator 70 to move the heating roller 61 from the release position to the nipping position.

In other words, the controller 300 causes the heating roller 61 to be moved and positioned in the nipping position by the nip/release actuator 70 while the sheet S is laid on the transfer position and before the foil transfer area TA of the sheet S reaches the transfer position. Moreover, the controller 300 causes the conveyor rollers 11A, 11B, 11C, 12A and 12B to stop while the sheet S is laid on the transfer position and before the heating roller 61 reaches the nipping position. Thereafter, the controller executes the same process steps as those of the pre-transfer process of control in the entire area transfer mode. The post-transfer process of control in the rearward area transfer mode is the same as the post-transfer process of control in the entire area transfer mode (see FIG. 7B).

The pre-transfer process of control in the central area transfer mode is the same as the pre-transfer process of control in the rearward area transfer mode (see FIG. 7D). The post-transfer process of control in the central area transfer mode is the same as the post-transfer process of control in the forward area transfer mode (see FIG. 7C).

Next, a detailed description will be given of an operation of the controller 300. When the foil transfer device 1 is powered on, the controller 300 repeatedly executes a process shown in FIG. 8.

Figure 8:
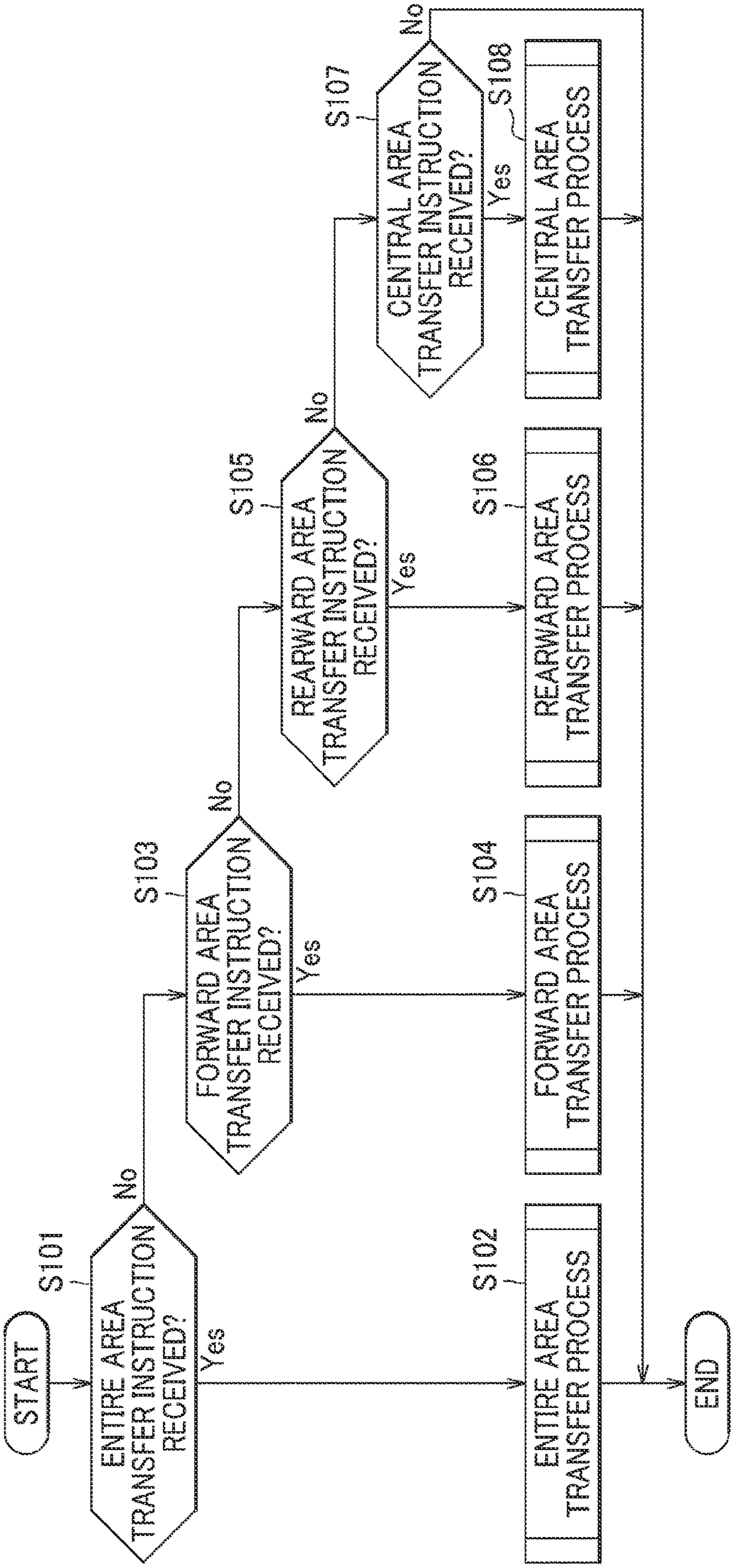
FIG. 8 is a flowchart showing a process of operation of a controller.

In the process shown in FIG. 8, the controller 300, first, makes a determination as to whether or not an entire area transfer instruction has been received (S101). If it is determined in step S101 that the entire area transfer instruction has been received (Yes), then the controller 300 executes an entire area transfer process (S102), and brings this round of the process to an end.

If it is determined in step S101 that the entire area transfer instruction has not been received (No), then the controller 300 further makes a determination as to whether or not a forward area transfer instruction has been received (S103). If it is determined in step S103 that the forward area transfer instruction has been received (Yes), then the controller 300 executes the forward area transfer process (S104), and brings this round of the process to an end.

If it is determined in step S103 that the forward area transfer instruction has not been received (No), then the controller 300 further makes a determination as to whether or not a rearward area transfer instruction has been received (S105). If it is determined in step S105 that the rearward area transfer instruction has been received (Yes), then the controller 300 executes the rearward area transfer process (S106), and brings this round of the process to an end.

If it is determined in step S105 that the rearward area transfer instruction has not been received (No), then the controller 300 further makes a determination as to whether or not a central area transfer instruction has been received (S107). If it is determined in step S107 that the central area transfer instruction has been received (Yes), then the controller 300 executes the central area transfer process (S108), and brings this round of the process to an end. If it is determined in step S107 that the central area transfer instruction as not been received (No), then the controller 300 brings this round of the process to an end.

Figure 9:
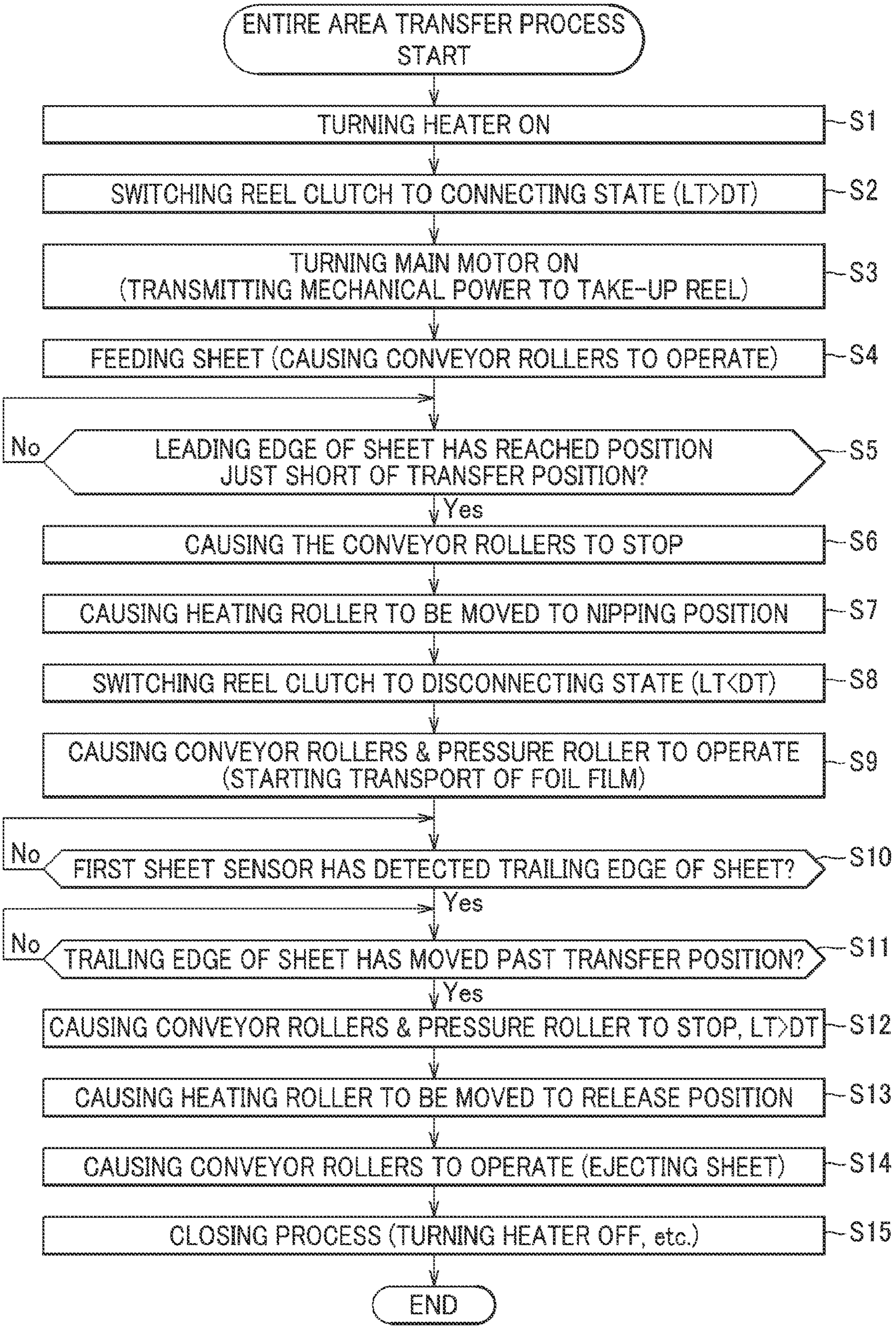
FIG. 9 is a flowchart showing the entire area transfer process.

Referring now to FIG. 9, the entire area transfer process will be described below.

In the entire area transfer process, the controller 300 first turns the heater in the heating roller 61 on (S1), and then switches the reel clutch C2 to the connecting state (S2). To be more specific, the controller 300 switches the reel clutch C2 to the connecting state after having waited for some period of time elapsed from the turn-on of the heater until the temperature of the heating roller 61 is raised to a temperature sufficiently close to a target temperature.

When the reel clutch C2 is switched to the connecting state in step S2, the loading torque LT takes on LT1+LT2, greater than the driving torque DT. After step S2, the controller 300 turns the main motor 80 on (S3). In other words, the controller 300 is configured such that when the main motor 80 is caused to start generating mechanical power upon receipt of the entire area transfer instruction, the film-transport regulator is in the restricted state. When the main motor 80 is powered on, the mechanical power generated by the main motor 80 is transmitted via the take-up side torque limiter TL1 to the take-up reel 35. Accordingly, the driving torque DT is applied to the take-up reel 35; however, because LT>DT as a result of the process in step S2, the foil film F is restrained by the loading torque LT from being drawn out from the supply reel 31. As a result, the foil film F is pulled by the take-up reel 35 to which the driving torque DT is applied; however, as the supply reel 31 and the take-up reel 35 stop rotating, the foil film F remains stopping under a predetermined tension without being transported.

After step S3, the controller 300 switches the pickup clutch C1 to a connecting state, i.e., transmitting state, and starts feeding a sheet S (S4). To be more specific, the controller 300 is configured to pass an electric current through the pickup clutch C1 for a time period required to convey a single sheet S by the pickup roller 11A, so that the pickup roller 11A is caused to operate (rotate) for a predetermined period of time. It is to be understood that the time to stop the operation of the pickup roller 11A may be determined based on a time of detection of the leading edge of the sheet S by the first sheet sensor SS1.

After step S4, the controller 300 makes a determination as to whether or not the leading edge of the sheet S has reached a position just short of the transfer position (S5). To be more specific, in step S5, the determination made by the controller 300 as to whether or not the leading edge of the sheet S has reached a position just short of the transfer position is based on a period of time lapsed from a time of detection of the leading edge of the sheet S by the first sheet sensor SS1. Determinations as to whether or not the trailing edge or the foil transfer area TA of a sheet S has reached a position just short of the transfer position, or whether or not the leading or trailing edge or the foil transfer area TA of a sheet S has moved past the transfer position, as will be described later, may be made in the same way, i.e., based on a period of time lapsed from a time of detection of the leading edge or relevant position of the sheet S by the first sheet sensor SS1.

If it is determined in step S5 that the leading edge of the sheet S has reached a position just short of the transfer position (Yes), then the controller 300 causes the conveyor rollers 11A, 11B, 11C, 12A and 12B to stop (S6). Accordingly, the conveyance of the sheet S is stopped with the leading edge of the sheet S is positioned short of the transfer position.

After step S6, the controller 300 turns the nip/release motor 90 on, and causes the nip/release actuator 70 to move the heating roller 61 from the release position to the nipping position (S7). To be more specific, in step S7, the controller 300 makes a determination based on a signal received from the position sensor SA, after turning the nip/release motor 90 on, as to whether or not the heating roller 61 is positioned in the nipping position, and if it is determined that the heating roller 61 is positioned in the nipping position, then turns the nip/release motor 90 off. When the heating roller 61 is to be moved from the nipping position to the release position, as well, the controller 300 exercises control over the nip/release motor 90 in a similar manner.

After step S7, specifically, after the heating roller 61 moves to the nipping position, the controller 300 switches the reel clutch C2 to the disconnecting state (step S8). Accordingly, after the state of the pressure roller 51 and the heating roller 61 is switched to the nip state, the loading torque LT takes on LT1, which is smaller than the driving torque DT. Supposing the loading torque LT were made smaller than the driving torque DT before switching of the state of the pressure roller 51 and the heating roller 61 to the nip state, the take-up reel 35 would start rotating and the foil film F would be transported uselessly and taken up to waste. Therefore, it is proposed as described above that the loading torque LT be made smaller than the driving torque DT after the state of the pressure roller 51 and the heating roller 61 is switched to the nip state (i.e., after the foil film F is nipped between the pressure roller 51 and the heating roller 61), so that the start of rotation of the take-up reel 35 is deferred. Consequently, useless transport of the foil film F can be restrained.

It is to be understood that the steps S6 to S8 may be executed in an order different from that in the present embodiment, and may be executed at the same time.

The timing of switching the reel clutch C2 to the disconnecting state may be determined, for example, based on the time at which the nip/release motor 90 is turned on or the time at which a signal indicative that the heating roller 61 is not in the release position is received from the position sensor SA. If the position sensor SA is configured to output a first signal (e.g., Low signal) while the heating roller 61 is in the release position, and to output a second signal (e.g., High signal) immediately after the heating roller 61 starts moving from the release position, the second signal is the signal indicative that the heating roller 61 is not in the release position.

After step S8, the controller 300 switches the conveyor clutch C3 and the roller clutch C5 to the connecting state (S9). Accordingly, the mechanical power generated by the main motor 80 is transmitted to the conveyor rollers 11B, 11C, 12A and 12B and the pressure roller 51, and causes the conveyance of the sheet S and the transport of the foil film F to start.

After step S9, the controller 300 makes a determination as to whether the first sheet sensor SS1 has detected the trailing edge of the sheet S (S10). If it is determined in step S10 that the trailing edge of the sheet S has been detected (Yes), then the controller 300 further makes a determination based upon a period of time lapsed from a time of detection of the trailing edge of the sheet S by the first sheet sensor SS1 as to whether or not the trailing edge of the sheet S has moved past the transfer position (S11). In other words, in step S11, a determination is made as to whether or not the transfer of foil onto a toner image formed on the foil transfer area TA has been completed.

Herein, the time of determination made as to whether or not the trailing edge of the sheet S has moved past the transfer position, i.e., the time of completion of the foil transfer may be a point in time at which the trailing edge of the foil transfer area TA of the sheet S goes past the second guide shaft 42 (see FIG. 1) as a separator roller.

In the present embodiment, the time of completion of the foil transfer is set at a point in time at which the trailing edge of the foil transfer area TA of the sheet S goes past the second guide shaft 42, i.e., the time of expiry of a predetermined time period from the time at which the trailing edge of the sheet S has gone past the transfer position. With the time of completion of the foil transfer set as described above, the foil film F can be restrained from stopping before completion of separation (peeling) of the foil film F from the sheet S (from the toner image on the sheet S), so that the foil film F (supporting layer F1) can be peeled clean from the toner image.

If it is determined in step S11 that the trailing edge of the sheet S has moved past the transfer position (Yes), then the controller 300 switches the conveyor clutch C3 and the roller clutch C5 to the disconnecting state to cause the conveyor rollers 11B, 11C, 12A and 12B, and the pressure roller 51 to stop rotating, and switches the reel clutch C2 to the connecting state to make the condition of relative torques to LT>DT (S12). In step S12, by causing the conveyor rollers 11B, 11C, 12A and 12B, and the pressure roller 51 to stop rotating, the conveyance of the sheet S and the transport of the foil film F are stopped.

In this illustrative example, the stopping of the operation (rotation) of the conveyor rollers 11B, 11C, 12A and 12B and the pressure roller 51 and the switching of the reel clutch C2 to the connecting state are timed to take place substantially simultaneously, though they may be configured to take place at different times.

After step S12, the controller 300 turns the nip/release motor 90 on, to cause the nip/release actuator 70 to move the heating roller 61 from the nipping position to the release position in which the heating roller 61 is separated from the pressure roller 51 (S13). Herein, because the condition of relative torques has been changed in step S12 to satisfy LT>DT, the transport of the foil film F will not start but remains at a standstill even when the heating roller 61 is caused to move away from the pressure roller 51 in step S13.

After step S13, the controller 300 switches the conveyor clutch C3 to the connecting state, to cause the conveyor rollers 11B, 11C, 12A and 12B to operate (S14). Accordingly, the conveyance of the sheet S restarts, and the sheet S is ejected to the outside of the housing 2.

After step S14, the controller 300 executes a closing process (S15), and brings this entire area transfer process to an end. Herein, the closing process includes several operations such as turning the heater off, turning the main motor 80 off, switching the clutches to the disconnecting state, etc.

Figure 10:
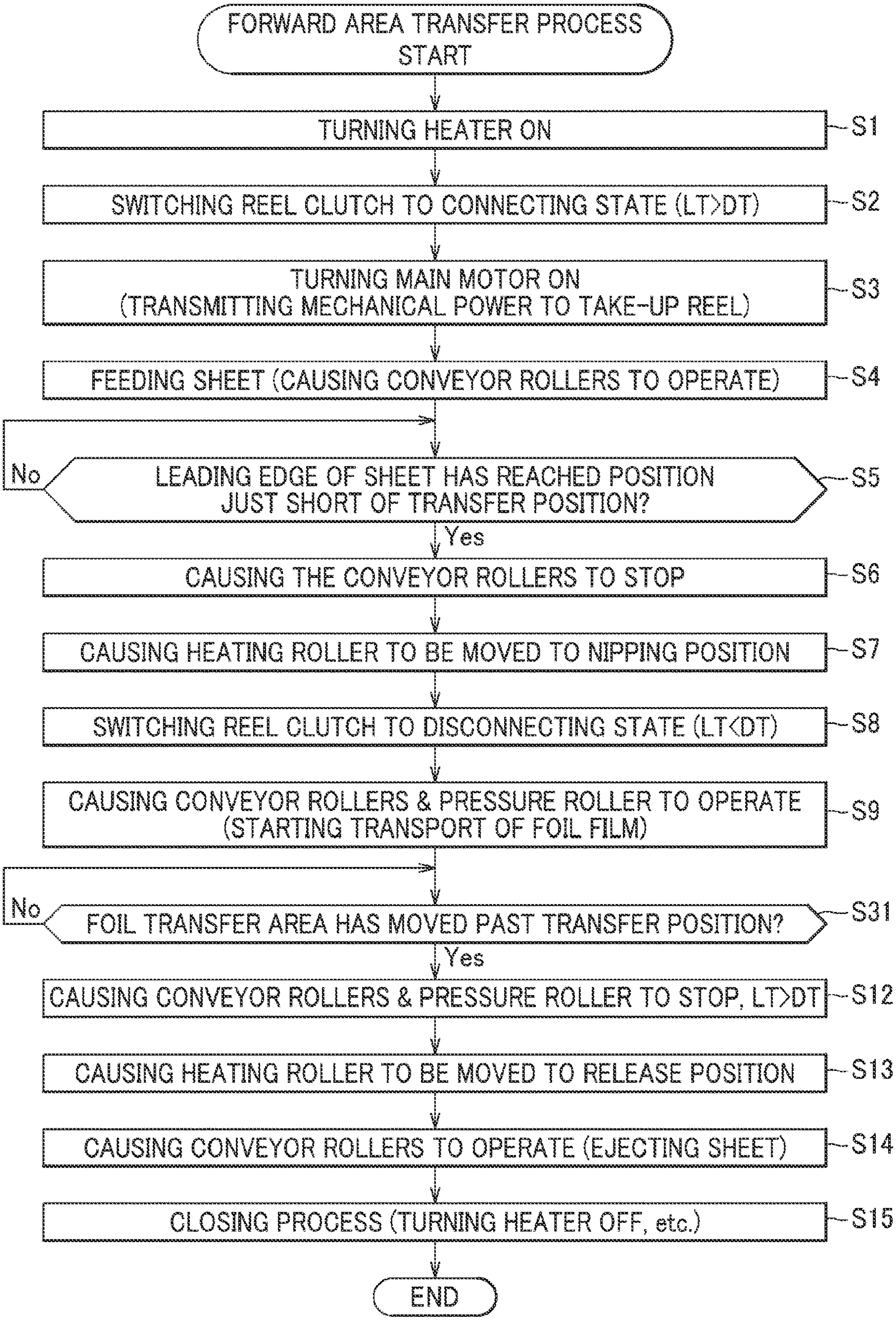
FIG. 10 is a flowchart showing the forward area transfer process.

Referring now to FIG. 10, the forward area transfer process will be described below. The forward area transfer process is different only in part of a post-transfer process from the entire area transfer process, and the other part of process steps is substantially the same as that of the entire area transfer process; therefore the same process steps are designated by the same reference characters, and a duplicate description thereof will be omitted.

In the forward area transfer process shown in FIG. 10, after completion of the process in steps S1 to S9, the controller 300 makes a determination as to whether or not the foil transfer area TA defined in a location shifted on a front side with respect to the center of the surface of the sheet S in the direction of conveyance of the sheet S has moved past the transfer position (S31). In other words, the controller 300 makes a determination, in step S31, as to whether or not the foil transfer onto the foil transfer area TA located on the front side with respect to the center of the surface of the sheet S is complete. If it is determined in step S31 that the foil transfer area TA has moved past the transfer position (Yes), then the controller 300 executes the process in steps S12 to S15, and brings this forward area transfer process to an end.

Figure 11:
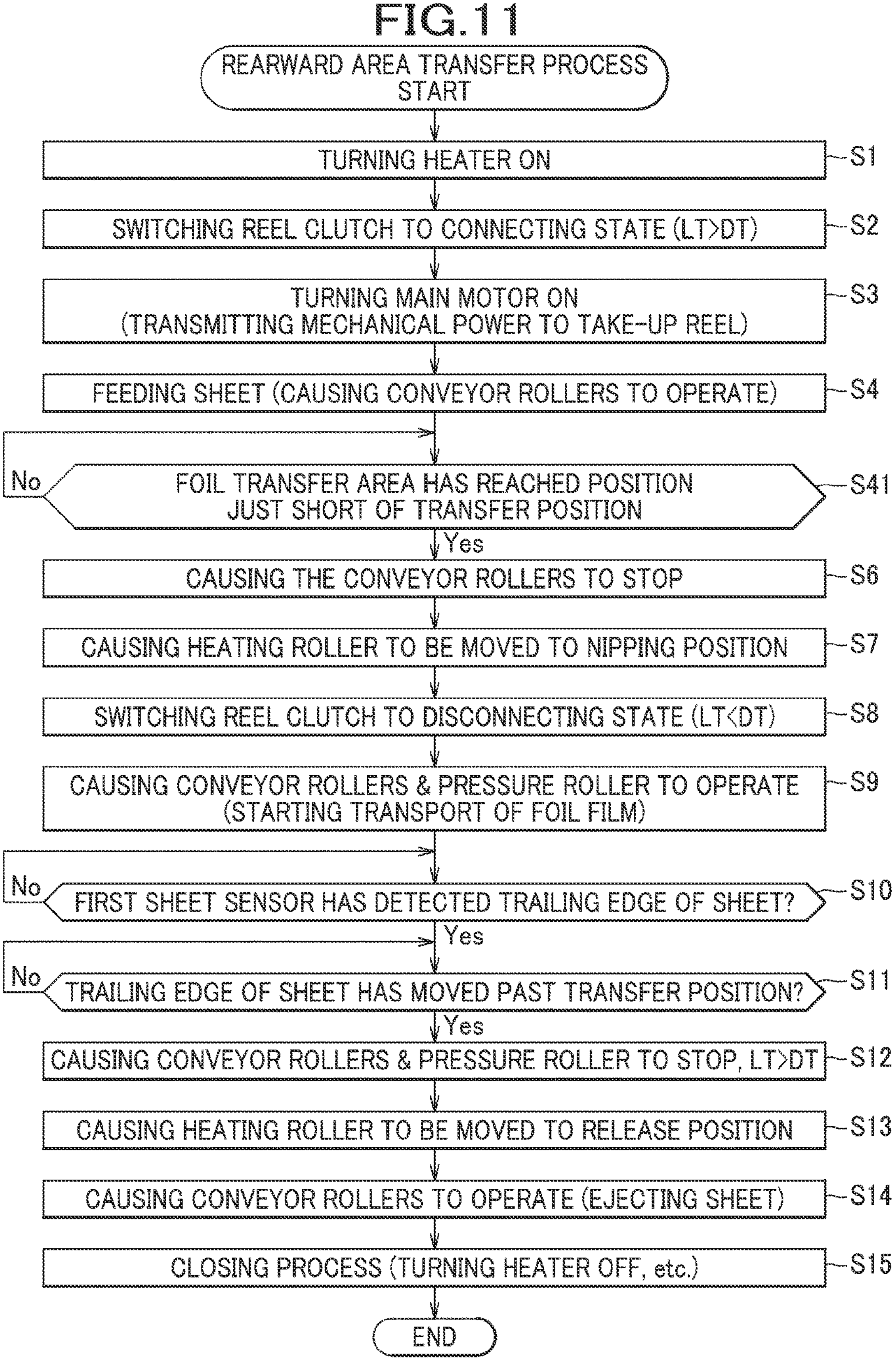
FIG. 11 is a flowchart showing the rearward area transfer process.

Referring now to FIG. 11, the rearward area transfer process will be described below. The rearward area transfer process is different only in part of a pre-transfer process from the entire area transfer process, and the other part of process steps is substantially the same as that of the entire area transfer process; therefore, the same process steps are designated by the same reference characters, and a duplicate description thereof will be omitted.

In the rearward area transfer process shown in FIG. 11, after completion of the process in steps S1 to S4, the controller 300 makes a determination as to whether or not the foil transfer area TA defined in a location shifted on a rear side with respect to the center of the surface of the sheet S in the direction of conveyance of the sheet S has reached a position just short of the transfer position (S41). If it is determined in step S41 that the foil transfer area TA has reached a position just short of the transfer position (Yes), then the controller 300 executes the process in step S6. Thereafter, the controller 300 executes the process in steps S7 to S15, and brings this rearward area transfer process to an end.

Figure 12:
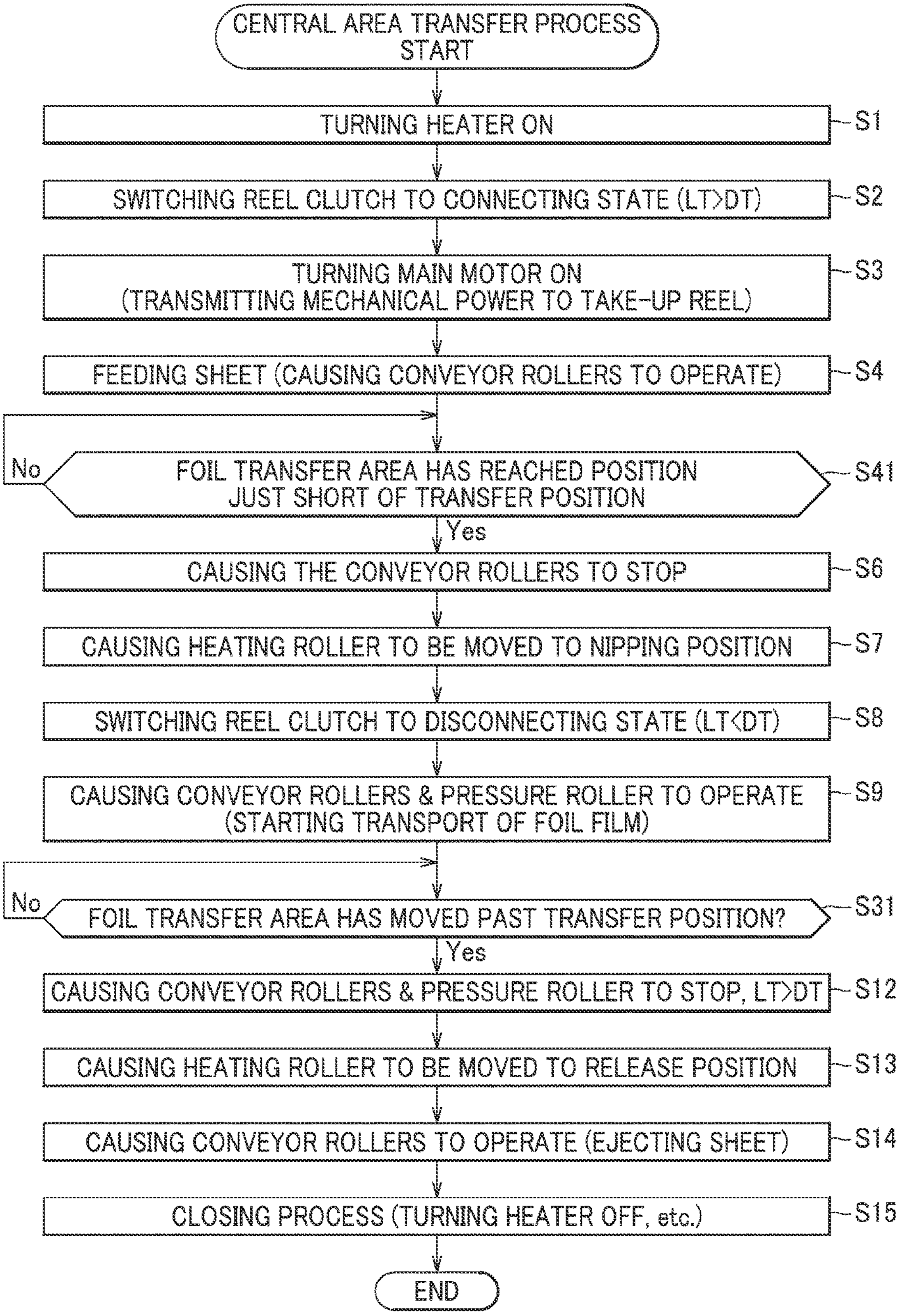
FIG. 12 is a flowchart showing the central area transfer process.

Next, referring to FIG. 12, the central area transfer process will be described below. The pre-transfer process in the central area transfer process is the same process as the pre-transfer process in the rearward area transfer process, and the post-transfer process in the central area transfer process is the same process as the post-transfer process in the forward area transfer process. Therefore, the same process steps are designated by the same reference characters and a duplicate description thereof will be omitted.

In the central area transfer process, the controller 300 executes a pre-transfer process including steps S1 to S4, S41, and S6 to S9. Thereafter, the controller 300 further executes a post-transfer process including steps S31, and S12 to S15, and brings this central area transfer process to an end.

According to this embodiment described above, the following advantageous effects can be achieved.

In the pre-transfer process executed in the central area transfer mode or the rearward area transfer mode, the transport of the foil film F drawn from the supply reel 31 starts while the sheet S is laid on the transfer position (i.e., after the sheet enters the transfer position), and thus the foil film F which would be wasted if the transport of the foil film F starts before the sheet S reaches the transfer position can be utilized, so that waste of the foil film F can be reduced significantly.

In the pre-transfer process executed in the central area transfer mode or the rearward area transfer mode, the conveyance of the sheet S can be stopped before the heating roller 61 starts being pressed against the pressure roller 51 not in operation (i.e., not rotated). Accordingly, the sheet S can be prevented from entering the transfer position that is a position in which the foil film F and the sheet S are to be nipped between the heating roller 61 and the pressure roller 51, before effecting the operation (rotation) of the rollers 51, 61 (i.e., starting the transport of the foil film F) by the roller clutch C5. Therefore, undesirable warpage or wrinkling which would occur in the sheet S fed into the transfer position formed between the rollers 51, 61 not in operation can be avoided.

In the post-transfer process executed in the central area transfer mode or the forward area transfer mode, the transport of the foil film F drawn from the supply reel 31 stops while the sheet S is laid on the transfer position (i.e., before the sheet S exits the transfer position), and thus the foil film F which would be wasted if the transport of the foil film F stops after the sheet S moves past the transfer position (as in the entire area transfer mode) can be utilized, so that waste of the foil film F can be reduced significantly.

In the post-transfer process executed in the central area transfer mode or the forward area transfer mode, when the operation (rotation) of the pressure roller 51 and the heating roller 61 being pressed against each other are stopped before the heating roller 61 is moved to the release position, the conveyance of the sheet S can be stopped, so that undesirable warpage or wrinkling which would occur in the sheet S forced to be conveyed while being nipped and held in the transfer position between the rollers 51, 61 not in operation can be avoided.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below. In describing the modified examples, the same structures or processes as those of the above-described embodiment are designated by the same reference characters, and a duplicate description thereof will be omitted.

In the above-described embodiment, the location and the length of the foil transfer area TA are specified by fixed values appropriate for each transfer mode. Alternatively, the location and the length of the foil transfer area TA may be configurable; specifically, the entry section B5 provided in the touch panel B5 may comprise a plurality of buttons through which the lengths of the foil transfer area TA applied in the forward area transfer mode, the central area transfer mode, and the rearward area transfer mode can be changed.

To be more specific, when a user chooses a transfer mode other than the entire area transfer mode, the entry section B5 allows a user to operate the buttons therein to specify the lengths of the foil transfer area TA for the chosen transfer mode other than the entire area transfer mode.

More specifically, the entry section B5 is configured to accept inputs or entry of information for specifying the location and the length of the foil transfer area TA in the direction of conveyance of the sheet S. For example, the location of the leading edge of the foil transfer area TA in the forward area transfer mode is predefined, for example, to be in the vicinity of the leading edge of the sheet S; therefore, the location of the trailing edge of the foil transfer area TA can be specified by entering a distance from the leading edge of the sheet S so that the foil transfer area TA for the forward area transfer mode is set. Similarly, the location of the trailing edge of the foil transfer area TA in the rearward area transfer mode is predefined, for example, to be in the vicinity of the trailing edge of the sheet S; therefore, the location of the leading edge of the foil transfer area TA can be specified by entering a distance from the leading edge of the sheet S so that the foil transfer area TA for the rearward area transfer mode is set.

For the central area transfer mode, as well, the locations of the leading edge and the trailing edge of the foil transfer area TA can be set by allowing a user to enter respective distances from the leading edge of the sheet S. Alternatively, the location of the leading edge of the foil transfer area TA may be specified by allowing a user to enter a distance from the leading edge of the sheet S and then enter a length of the foil transfer area TA so that the foil transfer area TA for the central area transfer mode is set.

With this feature of freely configurable foil transfer area TA as described above, for example, even when transfer of foil onto a sheet S having a predetermined length in the direction of conveyance of the sheet S is followed by transfer of foil onto a subsequent sheet S having a length different from the predetermined length in the direction of conveyance of the sheet S, the location and the length of the foil transfer area TA can be specified as appropriate according to the length of the sheet S to be fed for foil transfer. However, the aforementioned feature which allows a user to freely specify the foil transfer area TA would potentially cause an operating error made by the user entering information through the entry section B5 with the result that the location of the foil transfer area TA specified by the user would be outside the surface of the sheet S being fed.

Figure 14:
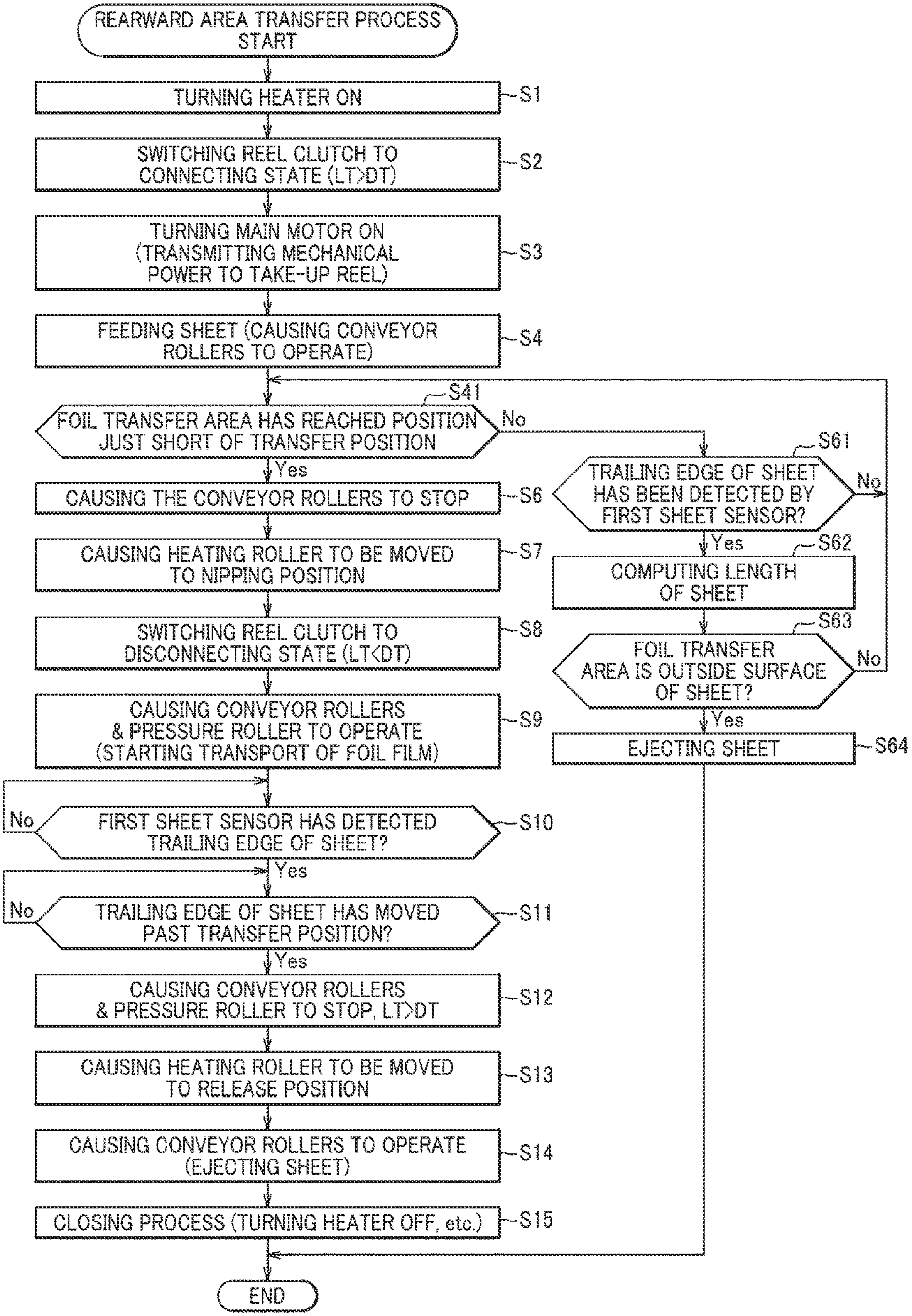
FIG. 14 is a flowchart showing a modified rearward area transfer process.
Figure 15:
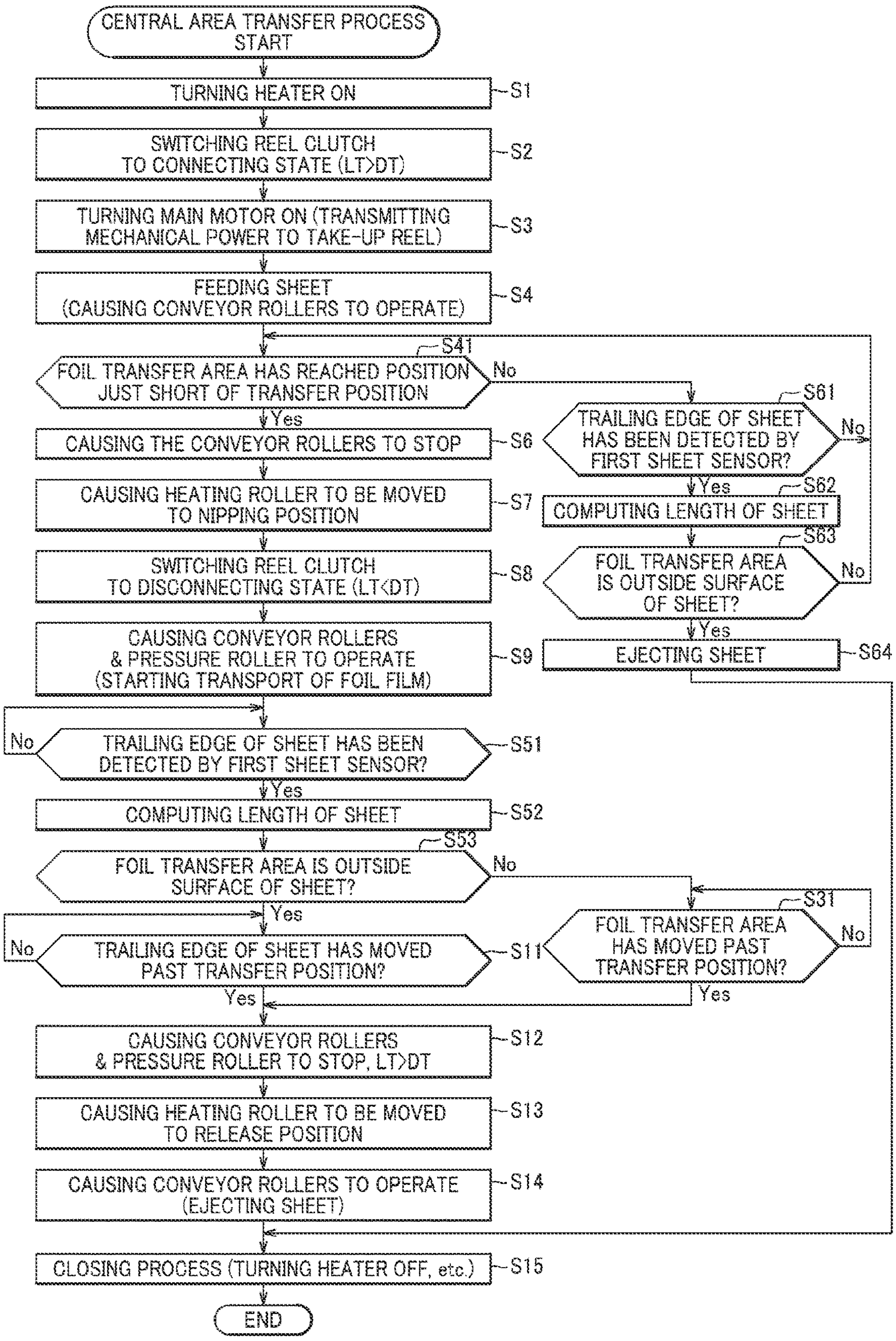
FIG. 15 is a flowchart showing a modified central area transfer process.

If the controller 300 executes the process as described above by making use of information on the user-specified foil transfer area TA, the foil film F would disadvantageously be transported uselessly while the foil transfer area TA specified to be outside the surface of the sheet S being fed moves past the transfer position. To address this problem, the controller 300 may be configured to execute a modified forward area transfer process, a modified rearward area transfer process, and a modified central area transfer process as shown in FIG. 13, FIG. 14, and FIG. 15, respectively.

Figure 13:
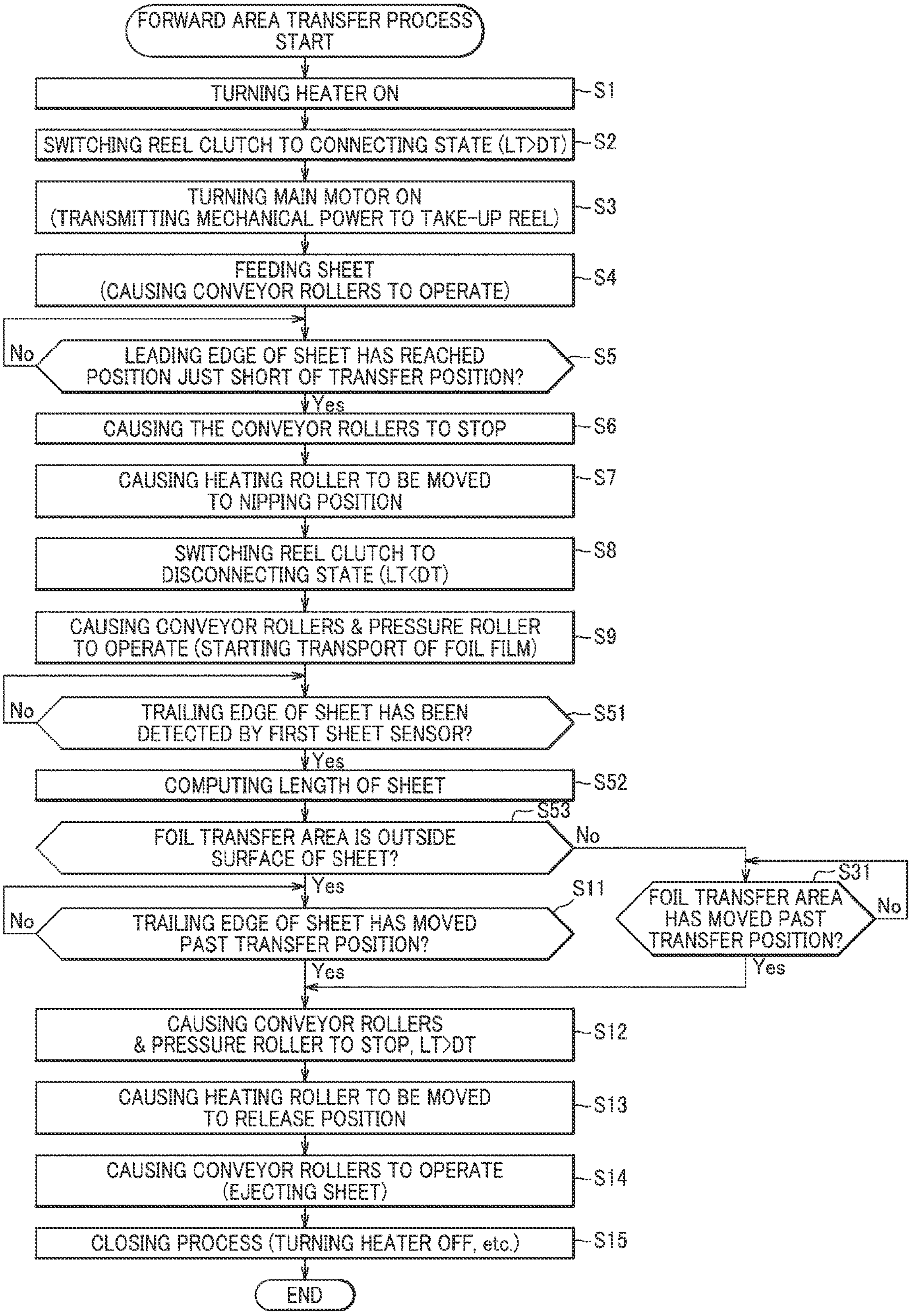
FIG. 13 is a flowchart showing a modified forward area transfer process.

In the forward area transfer process shown in FIG. 13, the controller 300 executes the process in steps S1 to S9. After step S9, the controller 300 makes a determination as to whether or not the trailing edge of a sheet S has been detected by the first sheet sensor SS1 (S51). If it is determined in step S51 that the trailing edge of the sheet S has been detected (Yes), then the controller 300 computes the length of the sheet S (S52). To be more specific, the controller 300 computes the length of the sheet S, based on a period of time lapsed from a time of detection of the leading edge of the sheet S to a time of detection of the trailing edge of the sheet S by the first sheet sensor SS1, and a speed of conveyance of the sheet S.

After step S52, the controller 300 makes a determination as to whether or not the foil transfer area TA is outside the surface of the sheet S being fed (S53). Herein, the location and the length of the foil transfer area TA are determined by the controller 300 at a time of entry of relevant information in the entry section B5, i.e., before execution of the foil transfer. Therefore, the controller 300 makes a determination, in step S53, based on the location and the length of the foil transfer area TA and the length of the sheet S, as to whether or not the foil transfer area TA is outside the surface of the sheet S.

To be more specific, since the location and the length of the foil transfer area TA are set based on the distances from the leading edge of the sheet S, the determination made by the controller 300 in step S53 is substantially equivalent to a determination as to whether or not the trailing edge of the foil transfer area TA specified through the entry section B5 is located upstream of the trailing edge of the sheet S in the direction of conveyance of the sheet S.

If it is determined in step S53 that the foil transfer area TA is outside the surface of the sheet S (Yes), then the controller 300 proceeds, as in the entire area transfer process described above, to make a determination as to whether or not the trailing edge of the sheet S has moved past the transfer position (S11). If it is determined in step S53 that the foil transfer area TA is not outside the surface of the sheet S (No), then the controller 300 proceeds, as in the forward area transfer process described above, to make a determination as to whether or not the foil transfer area TA has moved past the transfer position (S31).

Herein, with the feature of user-specifiable foil transfer area TA, for example, if the controller 300 executes the forward area transfer process as described above, the controller 300 proceeds, even when the foil transfer area TA is outside the surface of the sheet S, to execute the process in step S31. Accordingly, the foil film F would disadvantageously be transported uselessly until the foil transfer area TA located outside the surface of the sheet S moves past the transfer position.

To address this problem, herein, if the foil transfer area TA is outside the surface of the sheet S, the controller 300 causes the film-transport regulator to change the state of transport of the foil film F to the restricted state while the sheet S of which the foil transfer area TA has moved past the transfer position remains on the transfer position, i.e., before the foil transfer area TA moves past the transfer position and after the sheet S has moved past the transfer position (Yes in step S11). To be more specific, the controller 300, at this time, switches the roller clutch C5 (switching mechanism) to the disconnecting state to stop the operation of the pressure roller 51, and switches the reel clutch C2 to the connecting state to result in LT>DT (S12). Accordingly, the transport of the foil film F is stopped before the foil transfer area TA outside the surface of the sheet S moves past the transfer position, so that the useless transport of the foil film F, i.e., the waste of the foil film F, can be reduced.

After changing the state of transport of the foil film F by the switching mechanism to the restricted state in step S12, the controller 300 causes the nip/release actuator 70 to move the heating roller 61 to the release position (S13), then executes the process in steps S14 and S15, and brings this forward area transfer process to an end. If the foil transfer area TA is not outside the surface of the sheet S (No, in step S53), then the controller 300 waits until determination in step S31 turns out to be Yes, thereafter executes the process in steps S12 to S15, and brings this forward area transfer process to an end.

In the rearward area transfer process shown in FIG. 14, the controller 300 executes the process in steps S1 to S4 and S41. If it is determined in step S41 that the foil transfer area TA has reached a position just short of the transfer position (Yes), then the controller 300 executes the process in steps S6 to S15, and brings this rearward area transfer process to an end.

If it is determined in step S41 that the foil transfer area TA has not reached a position just short of the transfer position (No), then the controller 300 further makes a determination as to whether or not the first sheet sensor SS1 has detected the trailing edge of a sheet S (S61). If it is determined in step S61 that the trailing edge of the sheet S has been detected (Yes), then the controller 300 computes the length of the sheet S (S62).

After step S62, the controller 300 makes a determination as to whether or not the foil transfer area TA is outside the surface of the sheet S (S63). If it is determined in step S63 that the foil transfer area TA is outside the surface of the sheet S (Yes), then the controller 300 causes the sheet conveyor unit 10 (particularly, the sheet ejection mechanism 12) to eject the sheet S to the outside of the housing 2 (S64), and brings this rearward area transfer process to an end. To be more specific, in step S64, the controller 300 is configured such that the conveyor rollers 11B, 11C, 12A and 12B are caused to operate in such a manner that the sheet S moves past the transfer position and the sheet S having moved past the transfer position moves past the ejection roller 12B (the last conveyor roller in the direction of conveyance of the sheet S) while the heating roller 61 is positioned in the release position by the nip/release actuator 70, and the conveyor rollers 11B, 11C, 12A and 12B are caused to stop after the sheet S moves past the ejection roller 12B.

With this configuration, in which when the location of the foil transfer area TA is outside the surface of a sheet S being fed, the sheet S is ejected without being subjected to the foil transfer, the useless transport of the foil film F can be reduced, so that the foil film F can be utilized as much as possible and undesirable waste of the foil film F can be reduced significantly. If the determination in step S61 or S63 turns out to be No, the controller 300 goes back to the process in step S41.

In the central area transfer process shown in FIG. 15, the pre-transfer process is the same process as the pre-transfer process in the rearward area transfer process shown in FIG. 14, and the post-transfer process is the same process as the post-transfer process in the forward area transfer process shown in FIG. 13. Therefore, the same process steps are designated by the same reference characters and a duplicate description thereof will be omitted.

In the central area transfer process, the controller 300 executes a pre-transfer process including steps S1 to S4, S41, S6 to S9, and S61 to S64, and thereafter executes a post-transfer process including steps S51 to S53, S11, S31, and S12 to S15.

As shown in FIG. 16, the controller 300 may be configured to be capable of executing a successive transfer process in which a plurality of sheets S are conveyed successively at predetermined sheet intervals LC, to thereby successively transfer foil onto the plurality of sheets S. In FIG. 16, the foil film F is not illustrated for convenience in illustration.

In the successive transfer process, the controller 300 causes the conveyor rollers 11A, 11B, 11C, 12A and 12B to convey a first sheet SH1 and then convey a second sheet SH2 while conveying the first sheet SH1. It is to be understood that the successive transfer process may be executed in each transfer mode. In the following description, the successive transfer process executed in the forward area transfer mode will be explained as one example. Herein, the leading edge of the foil transfer area coincides with the leading edge of a sheet S.

When the second sheet SH2 is conveyed while the first sheet SH1 is being conveyed, the process of control executed by the controller 300 may be changed according to a distance (hereinafter referred to "first length L1") from a trailing edge of a first foil transfer area TA1 that is the foil transfer area of the first sheet SH1, to a trailing edge of the first sheet SH1. Specifically, the controller 300 may be configured to make a determination, according to the first length L1, as to whether to cause the heating roller 61 to move to the release position and then back to the nipping position, or keep the heating roller 61 in the nipping position, between the first foil transfer area TA1 and a second foil transfer area TA2 that is the foil transfer area of the second sheet SH2, i.e., during a period of time from a time when the first foil transfer area TA1 has moved past the transfer position until the second foil transfer area TA2 moves past the transfer position.

Figure 16A:
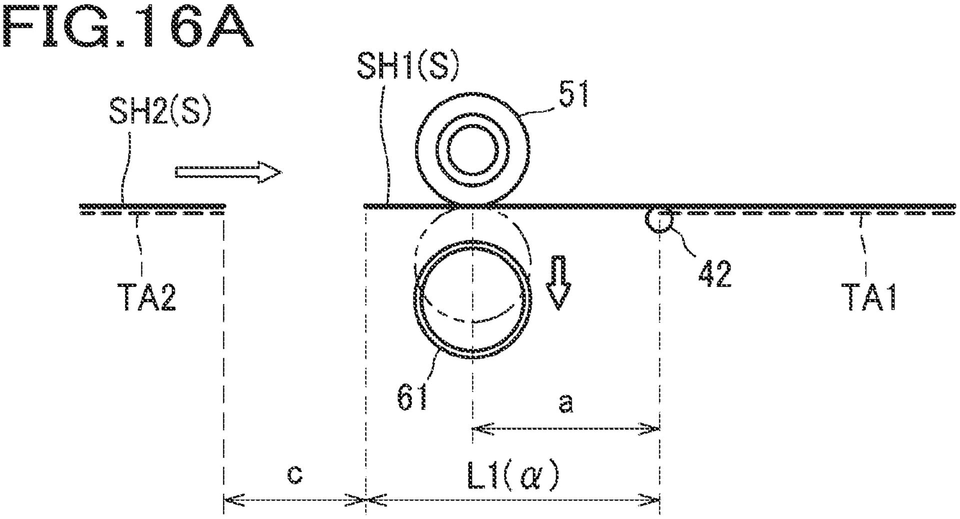
FIGS. 16A, 16B and 16C are diagrams for showing the amounts of transport of foil films which vary with operations of the heating roller being moved to a release position, moved to a nipping position, and kept in the nipping position, respectively, during conveyance of two sheets fed successively.

Herein, the switching operation of the nip/release actuator 70 moving the heating roller 61 to the release position after completion of foil transfer onto the first foil transfer area TA1 is timed to occur when the trailing edge of the first foil transfer area TA1 reaches the second guide shaft 42 as a separator roller for separating the foil film F from a sheet S, as shown in FIG. 16A. Accordingly, if the heating roller 61 is moved to the release position after completion of foil transfer onto the first foil transfer area TA1, a second length LA (corresponding to a distance from the transfer position to the second guide shaft 42) of the foil film F is transported uselessly without being utilized for foil transfer.

Figure 16B:
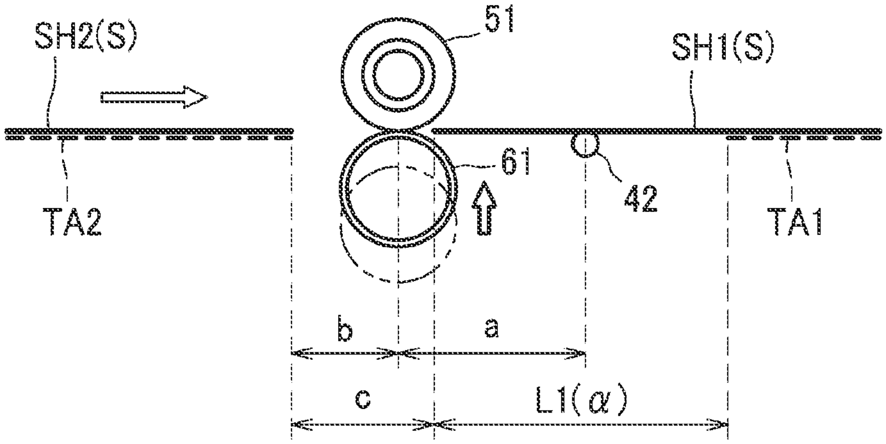

The switching operation of the nip/release actuator 70 moving the heating roller 61 to the nipping position after completion of foil transfer onto the first foil transfer area TA1 is timed to occur when the leading edge of the second sheet SH2 reaches a position just short of the transfer position, as shown in FIG. 16B. Accordingly, if the heating roller 61 is moved to the release position after completion of foil transfer onto the first foil transfer area TA1, a third length LB (corresponding to a distance from the leading edge of the second sheet SH2 having reached a position just short of the transfer position to the transfer position) of the foil film F is transported uselessly without being utilized for foil transfer. Consequently, if the heating roller 61 is moved to the release position and then back to the nipping position between the first sheet SH1 and the second sheet SH2 (between the first and second foil transfer areas TA1 and TA2), the amount of foil film F wasted by useless transport results in an amount corresponding to $LA+LB$.

Figure 16C:
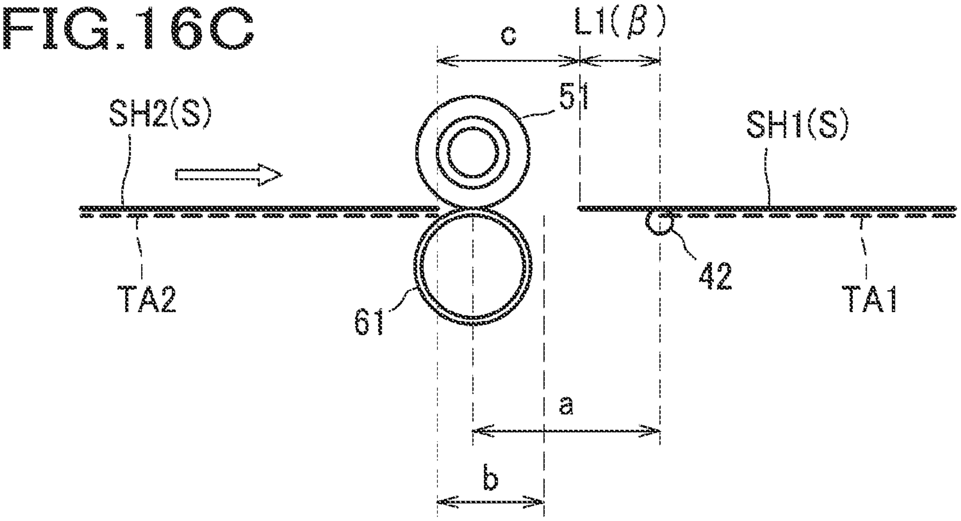

On the other hand, if the heating roller 61 is kept in the nipping position between the first sheet SH1 and the second sheet SH2, the amount of foil film F wasted by useless transport results in an amount corresponding to a length obtained by adding a sheet interval LC to the first length L1 described above. Therefore, if the first length L1 takes on a greater value $\alpha$ such as satisfying the inequality $L1+LC>LA+LB$, then the amount of foil film F wasted by useless transport is greater if the heating roller 61 is kept in the nipping position than if the heating roller 61 is moved to the release position and then back to the nipping position between the sheets SH1 and SH2, as shown in FIG. 16B. In contrast, if the first length L1 takes on such a smaller value $\beta$ as satisfying the inequality $L1+LC<LA+LB$, then the amount of foil film F wasted by useless transport is not reduced by moving the heating roller 61 to the release position between the sheets SH1 and SH2, as shown in FIG. 16C, so that this operation of the nip/release actuator 70 to move the heating roller 61 to the release position becomes meaningless. To be more specific, if $L1+LC<LA+LB$ is satisfied, the operation of the nip/release actuator 70 to move the heating roller 61 to the release position as effected after the trailing edge of the first foil transfer area TA1 moves past the second guide shaft 42 would take place after the leading edge of the second sheet SH2 moves past the transfer position; under the circumstances, the subsequent operation of the nip/release actuator 70 to move the heating roller 61 back to the nipping position would fail to finish placing the heating roller 61 in the nipping position before the leading edge of the second sheet SH2 (the second foil transfer area TA2) enters the transfer position. Accordingly, the operation of the nip/release actuator 70 to move the heating roller 61 to the release position would be useless.

Herein, the first length L1 (distance from the trailing edge of the first foil transfer area TA1 of the first sheet SH to the trailing edge of the first sheet SH1) is a variable which varies with the location and the length of the foil transfer areas TA in the direction of conveyance of the sheets S, as specified by a user through the entry section B5. The second length LA, the third length LB, and the sheet interval LC are fixed values. To be more specific, the sheet interval LC is a fixed value which satisfies $LC<LA+LB$. Thus, it turns out to be advantageous that the heating roller 61 is moved to the release position and then back to the nipping position on the condition that $L1>LA+LB-LC$ is satisfied, while the heating roller 61 is kept in the nipping position on the condition that $L1\leq LA+LB-LC$, in that the useless transport of the foil film F and the useless operation of the nip/release actuator 70 to move the heating roller 61 to the release position can be restrained.

To be more specific, if the first length L1 is longer than a predetermined distance Lth ($=LA+LB-LC$), the controller 300 executes a first forward area transfer process in which the state of transport of the foil film is changed from the release state to the restricted state by the film-transport regulator while the sheet S of which the first foil transfer area TA1 has moved past the transfer position remains on the transfer position, and the heating roller 61 is moved to the release position after the state of transport of the foil film is changed to the restricted state. On the other hand, if the first length L1 is equal to or shorter than the predetermined distance Lth, the controller 300 executes a second forward area transfer process in which the heating roller 61 is kept in the nipping position during a period of time from a time when the first foil transfer area TA1 has moved past the transfer position until the second foil transfer area TA2 moves past the transfer position.

Figure 17:
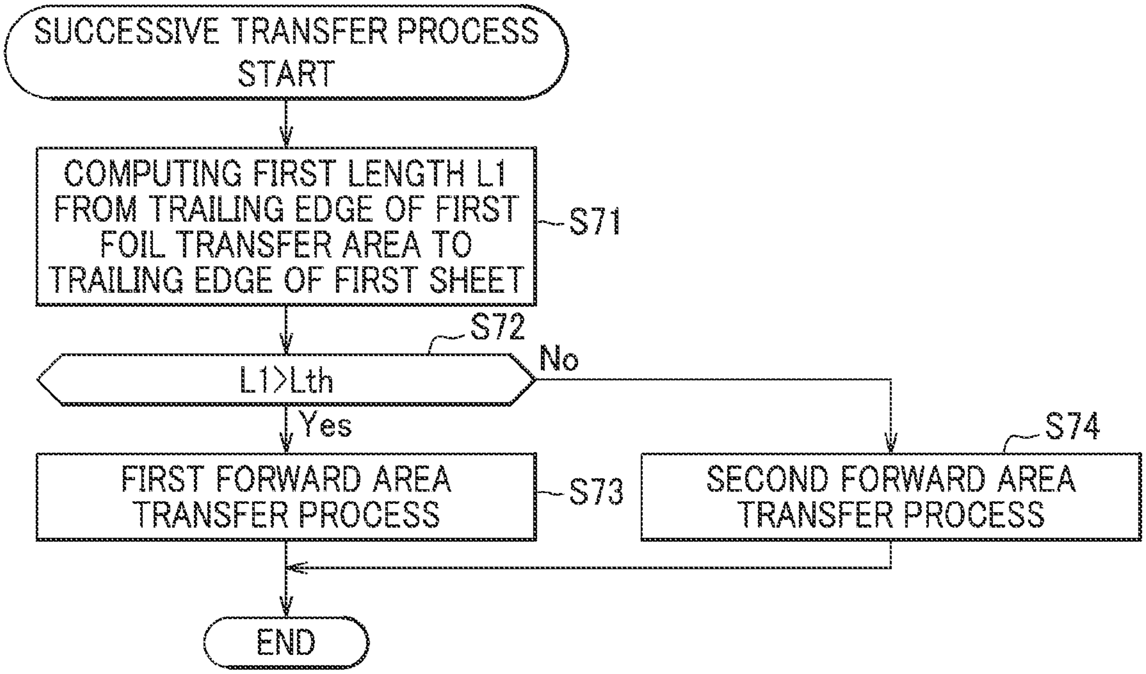
FIG. 17 is a flowchart showing a successive transfer process.

Next, a detailed description will be given of an operation of the controller 300. For example, when a plurality of sheets S are placed on the sheet tray 3 and the start button B6 is pressed (touched), the controller 300 executes the successive transfer process as shown in FIG. 17. In this example, the length of the sheet S is given prior to the execution of the successive transfer process by a user entering information through the entry section B5, and available for use in the controller 300.

In the successive transfer process, the controller 300, first, computes the first length L1 that is the distance from the trailing edge of the first foil transfer area TA1 to the trailing edge of the first sheet SH1, based on information about the foil transfer area TA and the length of the sheet S entered through the entry section B5 (S71). After step S71, the controller 300 makes a determination as to whether or not the first length L1 is longer than the predetermined length Lth (S72).

If it is determined in step S72 that $L1>Lth$ is satisfied (Yes), then the controller 300 executes the first forward area transfer process (S73), and brings this round of the process to an end. If it is determined in step S72 that $L1>Lth$ is not satisfied (No), then the controller 300 executes the second forward area transfer process (S74), and brings this round of the process to an end.

Figure 18:
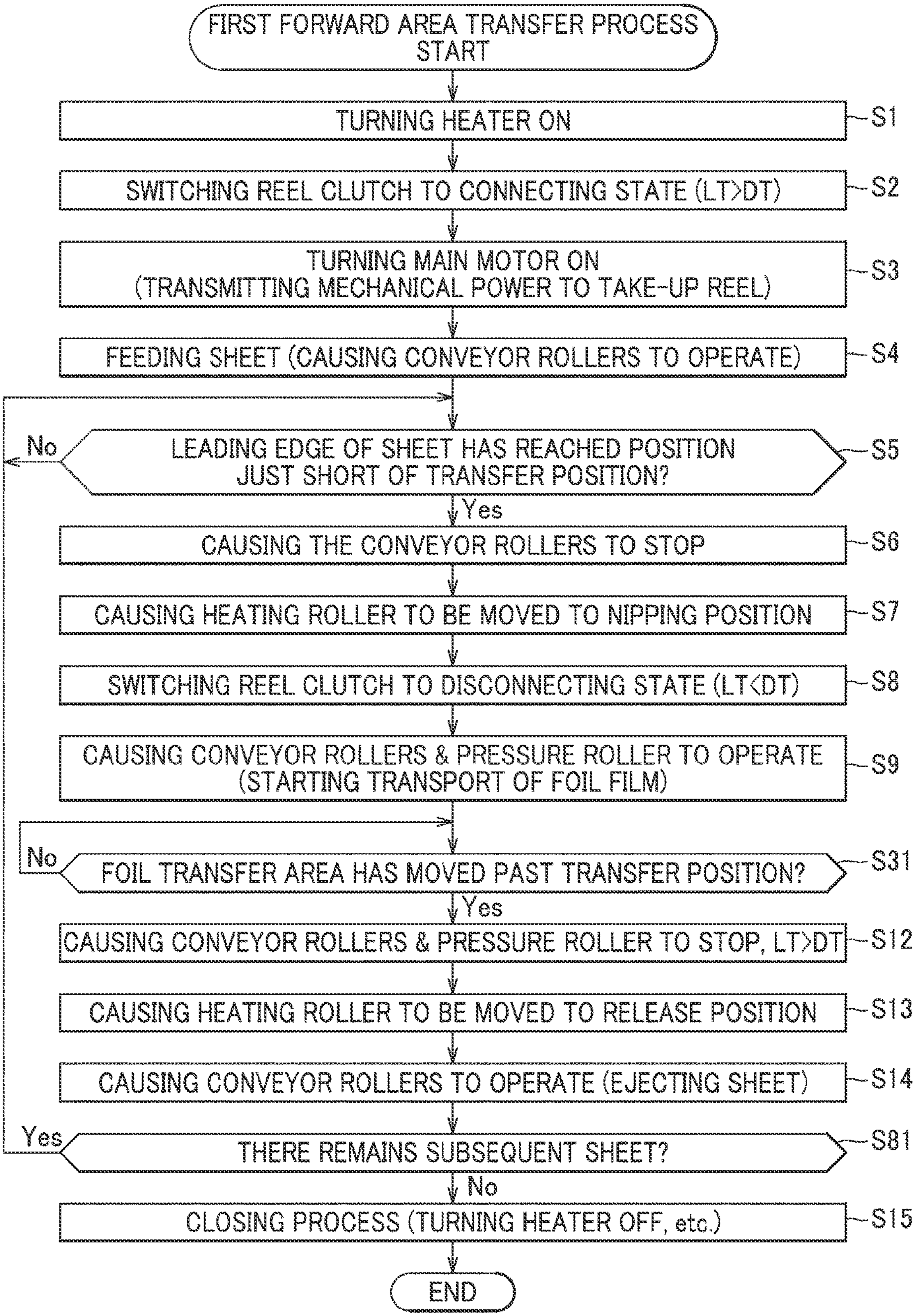
FIG. 18 is a flowchart showing a first forward area transfer process.

As shown in FIG. 18, in the first forward area transfer process, the controller 300 executes the same process steps as steps S1 to S9, S31, and S12 to S14 in the forward area transfer process shown in FIG. 10. Specifically, the controller 300 causes the nip/release actuator 70 to move the heating roller 61 to the nipping position when the leading edge of the sheet S reaches a position just short of the transfer position, so as to execute the foil transfer process, and to move the heating roller 61 to the release position after completion of the foil transfer process. After step S14, the controller 300 makes a determination as to whether or not there remains a subsequent sheet S to be subjected to the foil transfer process (S81).

If it is determined in step S81 that there remains a subsequent sheet S (Yes), then the controller 300 goes back to the process in step S5, in which the heating roller 61 is moved to the nipping position before foil transfer and to the release position after the foil transfer for the subsequent sheet S. If it is determined in step S81 that there remains no subsequent sheet S (No), then the controller 300 executes the process in step S15 and brings this first forward area transfer process to an end.

Figure 19:
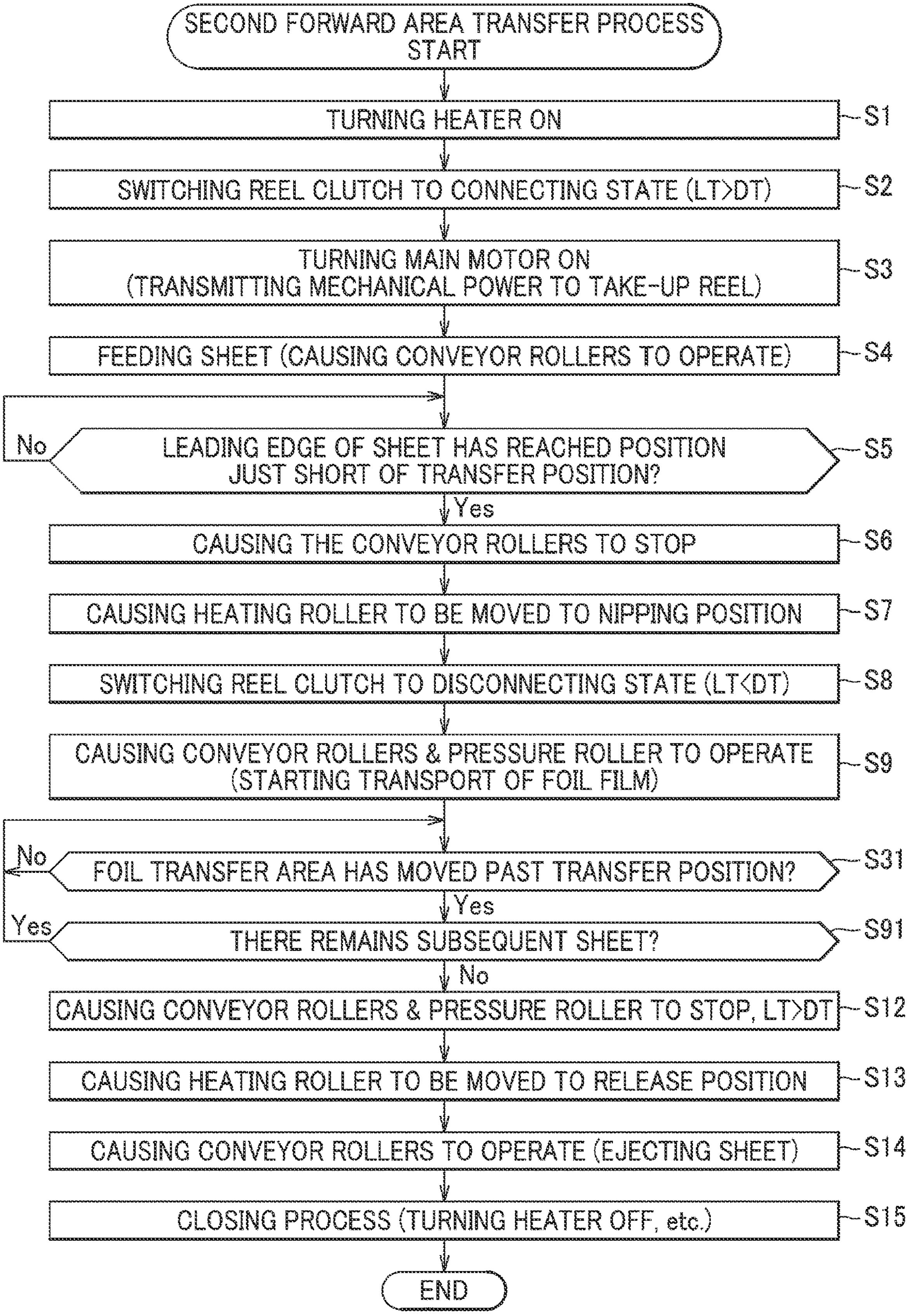
FIG. 19 is a flowchart showing a second forward area transfer process.

As shown in FIG. 19, in the second forward area transfer process, the controller 300 executes the same process steps as steps S1 to S9, and S31 in the forward area transfer process shown in FIG. 10. Specifically, the controller 300 causes the nip/release actuator 70 to move the heating roller 61 to the nipping position when the leading edge of the sheet S reaches a position just short of the transfer position, so as to execute the foil transfer process.

If it is determined in step S31 that the foil transfer area TA has moved past the transfer position (Yes), i.e., the foil transfer process has been completed, then the controller 300 makes a determination as to whether or not there remains a subsequent sheet S to be subjected to the foil transfer process (S91). If it is determined in step S91 that there remains a subsequent sheet S (Yes), then the controller 300 goes back to the process in step S31. That is, the controller 300 does not cause the nip/release actuator to move the heating roller 61 to the release position and keep the heating roller 61 in the nipping position even when the foil transfer process for the first sheet SH1 is completed, and proceeds to execute the foil transfer process for the second sheet SH2.

If it is determined in step S91 that there remains no subsequent sheet S (No), then the controller 300 executes the process in steps S12 to S15, and brings this second forward area transfer process to an end. That is, after completion of the foil transfer process for the last sheet S, the controller 300 causes the nip/release actuator 70 to move the heating roller 61 to the release position, and proceeds to execute the closing process (S15) and the like.

With this configuration, when the first length L1 is equal to or shorter than the predetermined distance Lth, the heating roller 61 is kept in the nipping position; thus, the meaningless step of separation of the heating roller 61 can be omitted. Moreover, when the first length L1 is longer than the predetermined distance Lth, the heating roller 61 is moved to the release position between the sheets S; thus, the useless transport of the foil film F can be reduced, so that the foil film F can be utilized as much as possible and waste of the foil film can be reduced significantly.

In the example described above, when the pressure roller 51 is stopped or in other occasions in each mode, all of the conveyor rollers 11A to 12B are stopped; however, it may be feasible that only one or more conveyor rollers in contact with the sheet S are stopped.

In the example described above, the heating roller 61 is moved, relative to the pressure roller 51, to the nipping position or to the release position; however, it may be feasible that the pressure roller 51 is moved, relative to the heating roller 61, to the nipping position or to the release position.

In the example described above, the roller clutch C5 is described as an example of the switching mechanism; however, the switching mechanism may, for example, be a dedicated motor for operating the pressure roller or the heating roller, such as a motor provided besides the main motor.

In the example described above, the foil transfer device for transferring foil onto a toner image formed on a sheet is described: however, the foil transfer device may be any type of the device which is configured to transfer foil onto a sheet.

In the example described above, the film cartridge 200 is configured to be installable into and removable from the holder 100, and the film cartridge 200 installed in the holder 100 is installable into and removable from the housing main body 21; in an alternative, for example, a film cartridge may be configured to be removably installable directly into a housing main body.

In the example described above, the supply reel 31 and the take-up reel 35 are both provided in the film cartridge 200; alternatively, the supply reel may be provided in the film cartridge and the take-up reel may be provided in the housing.

In the example described above, the entry section B5 with buttons shown in the touch panel TP is described as an example of the entry section; alternatively, the entry section may comprise push buttons (switches) that can be moved by operation of a user to a pressed position and to a release position.

In the example described above, the controller is configured to execute processes in each mode selected based on signals from the touch panel TP; in alternative example, for example, where an image forming apparatus and a foil transfer device are configured integrally in one device, the controller may make a determination as to the location and size (length or other dimensions) of the toner area on the surface of a sheet based on image data included in a printing/transfer instruction, and choose one of the modes based on the location and size of the toner area.

In the example described above, the optical sensor is described as an example of a position sensor; alternatively, the position sensor may be comprised of a lever interlocked with the nip/release actuator, and an optical sensor for detecting the position of the lever.

In the example described above, the sheet sensor is comprised of a lever and an optical sensor for detecting the lever; alternatively, the sheet sensor may be comprised only of an optical sensor.

In the example described above, the condition of relative torques is changed to satisfy LT>DT, to stop the transport of the foil film F; alternatively, the condition may be changed to LT>DT for the same purpose.

The torque changer described above is configured to include the reel clutch C2 and the supply side torque limiter TL2 for changing a loading torque LT imposed to the supply reel 31; alternatively, the torque changer may be configured to change the magnitude of the driving torque. For example, a dedicated motor for driving the take-up reel may be provided in addition to the main motor, and the dedicated motor may be configured as the torque changer. In this alternative configuration, the condition of the relative torques, i.e., the magnitude relation between the loading torque LT and the driving torque DT can be switched to LT<DT and to LT=DT by switching the dedicated motor on and off.

Furthermore, the torque changer may be a member movable between an engageable position in which it is engaged with the supply reel 31 to stop rotation of the supply reel 31 and a retreated position in which it is disengaged from the supply reel 31 to allow the supply reel 31 to rotate. In other words, the torque changer may be a mechanical lock mechanism capable of locking and releasing the rotation of the supply reel.

Instead of the roller clutch C5 and the pickup clutch C1, a dedicated motor for rotating the pressure roller 51 and a dedicated motor for rotating the pickup roller 11A may be provided.

In the example described above, the roller clutch C5 is described as an example of an switching mechanism, but the switching mechanism may be configured otherwise; for example, a pendulum (swing) gear configured to be swingable between a engaged position in which it is engaged with a predetermined gear of a transmission mechanism for transmitting a driving force to the pressure roller or the heating roller, and a disengaged position in which it is disengaged from the predetermined gear.

The foil film F described above has a four-layer structure as an example, but the foil film may have any number of layers as long as it includes a transfer layer and a supporting layer.

The elements described in the above embodiment and modified examples may be implemented selectively and in combination.

What is claimed is:

1. A foil transfer device for transferring foil onto a sheet laid on a foil film containing the foil, the foil transfer device comprising:
- a supply reel on which the foil film is wound;
- a take-up reel on which to take up the foil film;
- a heating roller configured to heat the foil film and the sheet;
- a pressure roller configured to rotate, with the foil film and the sheet being nipped between the heating roller and the pressure roller, to thereby cause the sheet to move forward together with the foil film drawn out from the supply reel;
- conveyor rollers configured to convey the sheet, to feed the sheet to a transfer position in which the foil film and the sheet are to be nipped between the heating roller and the pressure roller to transfer foil onto a foil transfer area defined on a surface of the sheet;
- a film-transport regulator capable of changing a state of transport of the foil film drawn out by the heating roller and the pressure roller, between a restricted state in which restriction is placed on the transport of the foil film and a release state in which the restriction is removed;
- a nip/release actuator configured to move a first roller that is one of the heating roller and the pressure roller, relative to a second roller that is another of the heating roller and the pressure roller, between a nipping position in which the first roller is pressed against the second roller, and a release position in which the first roller is separated from the second roller; and
- a controller configured to exercise control over the conveyor rollers, the nip/release actuator, and the film-transport regulator in such a manner that:
  - the sheet fed by the conveyor rollers reaches the transfer position while the first roller is positioned in the release position and the state of transport of the foil film is kept in the restricted state;
  - the first roller is moved and positioned in the nipping position while the sheet is laid on the transfer position and before the foil transfer area of the sheet reaches the transfer position; and
  - the state of transport of the foil film is changed from the restricted state to the release state after the first roller gets positioned in the nipping position,
- wherein the controller is configured such that:
  - when a sheet of which the foil transfer area is located at a first distance or farther from a leading edge of the sheet is fed, the first roller is moved and positioned in the nipping position while the sheet is laid on the transfer position and before the foil transfer area of the sheet reaches the transfer position, and the state of transport of the foil film is changed to the release state after the first roller gets positioned in the nipping position; and
  - when a sheet of which the foil transfer area is located at a distance shorter than the first distance from a leading edge of the sheet is fed, the first roller is moved and positioned in the nipping position before the sheet reaches the transfer position, and the state of transport of the foil film is changed to the release state after the first roller gets positioned in the nipping position.

2. The foil transfer device according to claim 1, wherein the film-transport regulator comprises a clutch configured to selectively effect and stop operation of the pressure roller and the heating roller, and
- wherein the controller is configured to:
  - cause the clutch to stop the operation of the pressure roller and the heating roller to thereby change the state of transport of the foil film to the restricted state; and
  - cause the clutch to effect the operation of the pressure roller and the heating roller to thereby change the state of transport of the foil film to the release state.

3. The foil transfer device according to claim 2, wherein the controller is configured to cause the conveyor rollers in contact with the sheet to stop while the sheet is laid on the transfer position and before the first roller reaches the nipping position.

4. The foil transfer device according to claim 1, wherein the film-transport regulator comprises a motor configured to selectively effect and stop operation of the pressure roller and the heating roller, and
- wherein the controller is configured to:
  - cause the motor to stop the operation of the pressure roller and the heating roller to thereby change the state of transport of the foil film to the restricted state; and
  - cause the motor to effect the operation of the pressure roller and the heating roller to thereby change the state of transport of the foil film to the release state.

5. The foil transfer device according to claim 4, wherein the controller is configured to cause the conveyor rollers in contact with the sheet to stop while the sheet is laid on the transfer position and before the first roller reaches the nipping position.

6. The foil transfer device according to claim 1, further comprising a position sensor configured to detect a position of the first roller,
- wherein the controller is configured to make a determination, based on a signal from the position sensor, as to whether or not the first roller is positioned in the nipping position.

7. The foil transfer device according to claim 1, further comprising an entry section through which to enter information for specifying a location and a length of the foil transfer area in a direction of conveyance of the sheet,
- wherein the controller is configured such that:

when the location of the foil transfer area specified through the entry section is outside the surface of a sheet being fed, the conveyor rollers are caused to operate in such a manner that the sheet moves past the transfer position and past the conveyor rollers while the first roller is positioned in the release position, and the conveyor rollers are caused to stop after the sheet moves past the conveyor rollers.

8. A foil transfer device for transferring foil onto a sheet laid on a foil film containing the foil, the foil transfer device comprising:

a supply reel on which the foil film is wound;

a take-up reel on which to take up the foil film;

a heating roller configured to heat the foil film and the sheet;

a pressure roller configured to rotate, with the foil film and the sheet being nipped between the heating roller and the pressure roller, to thereby cause the sheet to move forward together with the foil film drawn out from the supply reel;

conveyor rollers configured to convey the sheet, to feed the sheet to a transfer position in which the foil film and the sheet are to be nipped between the heating roller and the pressure roller to transfer foil onto a foil transfer area defined on a surface of the sheet;

a film-transport regulator capable of changing a state of transport of the foil film drawn out by the heating roller and the pressure roller, between a restricted state in which restriction is placed on the transport of the foil film and a release state in which the restriction is removed;

a nip/release actuator configured to move a first roller that is one of the heating roller and the pressure roller, relative to a second roller that is another of the heating roller and the pressure roller, between a nipping position in which the first roller is pressed against the second roller, and a release position in which the first roller is separated from the second roller; and a controller configured to exercise control over the conveyor rollers, the nip/release actuator, and the film-transport regulator in such a manner that:

before the foil transfer area of the sheet reaches the transfer position, the first roller is positioned in the nipping position and the state of transport of the foil film is kept in the release state;

the state of transport of the foil film is changed from the release state to the restricted state while the sheet of which the foil transfer area has moved past the transfer position remains on the transfer position; and after the state of transport of the foil film is changed to the restricted state, the first roller is moved to the release position, wherein the controller is configured such that:

when a sheet of which the foil transfer area is located at a second distance or farther from a trailing edge of the sheet is fed, the state of transport of the foil film is changed from the release state to the restricted state while the sheet of which the foil transfer area has moved past the transfer position remains on the transfer position, and the first roller is moved to the release position after the state of transport of the foil film is changed to the restricted state; and when a sheet of which the foil transfer area is located at a distance shorter than the second distance from a trailing edge of the sheet is fed, the state of transport of the foil film is changed from the release state to the restricted state after the sheet has moved past the transfer position, and the first roller is moved to the release position after the state of transport of the foil film is changed to the restricted state.

9. The foil transfer device according to claim 8, wherein the film-transport regulator comprises a clutch configured to selectively effect and stop operation of the pressure roller and the heating roller, and wherein the controller is configured to:

cause the clutch to stop the operation of the pressure roller and the heating roller to thereby change the state of transport of the foil film to the restricted state; and cause the clutch to effect the operation of the pressure roller and the heating roller to thereby change the state of transport of the foil film to the release state.

10. The foil transfer device according to claim 9, wherein the controller is configured to cause the conveyor rollers in contact with the sheet to stop when causing the clutch to stop the operation of the pressure roller and the heating roller.

11. The foil transfer device according to claim 8, wherein the film-transport regulator comprises a motor configured to selectively effect and stop operation of the pressure roller and the heating roller, and wherein the controller is configured to:

cause the motor to stop the operation of the pressure roller and the heating roller to thereby change the state of transport of the foil film to the restricted state; and cause the motor to effect the operation of the pressure roller and the heating roller to thereby change the state of transport of the foil film to the release state.

12. The foil transfer device according to claim 11, wherein the controller is configured to cause the conveyor rollers in contact with the sheet to stop when causing the motor to stop the operation of the pressure roller and the heating roller.

13. The foil transfer device according to claim 8, further comprising a sheet sensor having a detecting position located upstream of the heating roller in a direction of conveyance of the sheet and configured to detect a leading edge of the sheet moving past the detecting position, wherein the controller is configured to make a determination, based on a period of time lapsed from a time of detection of the leading edge of the sheet by the sheet sensor, as to whether or not the foil transfer area of the sheet has moved past the transfer position.

14. The foil transfer device according to claim 8, further comprising an entry section through which to enter information for specifying a location and a length of the foil transfer area in a direction of conveyance of the sheet, wherein the controller is configured such that:

when a trailing edge of the foil transfer area of which the location is specified through the entry section is located upstream of a trailing edge of a sheet being fed in the direction of conveyance of the sheet, the state of transport of the foil film is changed from the release state to the restricted state after the sheet has moved past the transfer position, and the first roller is moved to the release position after the state of transport of the foil film is changed to the restricted state.

15. The foil transfer device according to claim 8, wherein the controller is configured to cause the conveyor rollers to convey a first sheet and then convey a second sheet while conveying the first sheet, such that:

if a distance from a trailing edge of a first foil transfer area that is the foil transfer area of the first sheet to a trailing edge of the first sheet is equal to or shorter than a predetermined distance, the first roller is kept in the nipping position during a period of time from a time when the first foil transfer area has moved past the transfer position until a second foil transfer area that is the foil transfer area of the second sheet moves past the transfer position; and if the distance from the trailing edge of the first foil transfer area to the trailing edge of the first sheet is longer than the predetermined distance, the state of transport of the foil film is changed from the release state to the restricted state while the first sheet of which the first foil transfer area has moved past the transfer position remains on the transfer position, and the first roller is moved to the release position after the state of transport of the foil film is changed to the restricted state.

16. A foil transfer device for transferring foil onto a sheet laid on a foil film containing the foil, the foil transfer device comprising:

a supply reel on which the foil film is wound;

a take-up reel on which to take up the foil film;

conveyor rollers configured to convey the sheet;

a heating roller configured to heat the foil film and the sheet;

a pressure roller configured to rotate, with the foil film and the sheet being nipped between the heating roller and the pressure roller, to thereby cause the sheet to move forward together with the foil film drawn out from the supply reel;

a clutch configured to selectively effect and stop rotation of the pressure roller and the heating roller;

a nip/release actuator configured to move a first roller that is one of the heating roller and the pressure roller, relative to a second roller that is another of the heating roller and the pressure roller, between a nipping position in which the first roller is pressed against the second roller, and a release position in which the first roller is separated from the second roller; and a controller configured to:

drive the conveyor rollers to feed the sheet to a transfer position between the pressure roller and the heating roller while the first roller is positioned in the release position and the clutch is caused to stop rotation of the pressure roller and the heating roller;

move the first roller to position the first roller in the nipping position while the sheet is present at the transfer position and before a foil transfer area of the sheet on which the foil is to be transferred reaches the transfer position; and cause the clutch to effect rotation of the pressure roller and the heating roller to place the foil film in a release state in which the foil film is not restricted from being drawn out from the supply reel after the first roller is positioned in the nipping position, wherein the controller is configured such that:

when a sheet of which the foil transfer area is located at a first distance or farther from a leading edge of the sheet is fed, the first roller is moved and positioned in the nipping position while the sheet is present at the transfer position and before the foil transfer area of the sheet reaches the transfer position, and the foil film is placed in the release state after the first roller is positioned in the nipping position; and when a sheet of which the foil transfer area is located at a distance shorter than the first distance from a leading edge of the sheet is fed, the first roller is moved and positioned in the nipping position before the sheet reaches the transfer position, and the foil film is placed in the release state after the first roller is positioned in the nipping position.

17. The foil transfer device according to claim 16, further comprising a motor, wherein the clutch is switchable between a transmitting state in which a driving force is transmitted from the motor to the pressure roller and the heating roller and a shut-off state in which a driving force is not transmitted from the motor to the pressure roller and the heating roller.

18. The foil transfer device according to claim 17, wherein the controller is configured to switch the clutch to the transmitting state while driving the motor, after the first roller is positioned in the nipping position.

19. The foil transfer device according to claim 17, further comprising a torque limiter configured to limit a driving force of the motor exerted on the take-up reel to a value not greater than a predetermined value, wherein a loading torque is greater than a driving torque exerted on the take-up reel when the clutch is switched to the shut-off state.

* * * * *